United States Patent [19]
Ono et al.

[11] Patent Number: 5,884,250
[45] Date of Patent: Mar. 16, 1999

[54] DIGITAL VOICE TRANSMISSION SYSTEM

[75] Inventors: Hiroshi Ono; Masayuki Kushita, both of Tokyo, Japan

[73] Assignee: NEC Corporation, Tokyo, Japan

[21] Appl. No.: 907,021

[22] Filed: Aug. 6, 1997

[30] Foreign Application Priority Data

Aug. 23, 1996 [JP] Japan .................................. 8-222089

[51] Int. Cl.⁶ .................................................. G10L 9/00
[52] U.S. Cl. ............................................................ 704/201
[58] Field of Search .................................. 704/201, 270; 379/88.13, 100.16, 100.17, 88.28; 370/474, 521; 358/444; 455/412, 79

[56] References Cited

U.S. PATENT DOCUMENTS

| | | | |
|---|---|---|---|
| 5,327,461 | 7/1994 | Kushige ................................ | 375/244 |
| 5,412,719 | 5/1995 | Hamamoto et al. ..................... | 380/9 |
| 5,553,079 | 9/1996 | Niki et al. .............................. | 370/478 |
| 5,659,675 | 8/1997 | Kurokawa et al. ..................... | 345/433 |
| 5,781,553 | 7/1998 | Choi et al. ............................. | 370/464 |

FOREIGN PATENT DOCUMENTS

| | | | |
|---|---|---|---|
| 1-17878 | 5/1989 | Japan ............................. | H04M 3/42 |
| 4-79654 | 3/1992 | Japan ............................. | H04M 3/42 |
| 6-112884 | 4/1994 | Japan ............................. | H04B 7/26 |
| 6-164473 | 6/1994 | Japan ............................. | H04B 7/26 |
| 6-177978 | 6/1994 | Japan ............................. | H04B 7/26 |
| 6-202692 | 7/1994 | Japan ............................. | G10L 3/02 |
| 7-203515 | 8/1995 | Japan ............................. | H04Q 7/16 |
| 7-236168 | 9/1995 | Japan ............................. | H04Q 7/14 |
| 8-289348 | 11/1996 | Japan ............................. | H04Q 7/26 |

*Primary Examiner*—Richemond Dorvil
*Attorney, Agent, or Firm*—Whitham, Curtis & Whitham

[57] ABSTRACT

The object of the invention is to provide a digital voice transmission system which suppresses, even when a long voice message is to be transmitted, an increase of the transmission capacity of a radio channel and, even if a drop of a division of divisionally transmitted voice compression data occurs, it is prevented that the voice data becomes difficult to hear. Data including a radio apparatus identification code, a message identification code, a division number, a digital voice compression data identification code, text message length information, a text message, reproduction time information, a system possession voice data identification code possessed by the transmission side irrespective of whether or not radio transmission is employed, system possession reproduction time information, a voice start code and digital voice compression data are transmitted. The voice compression data are divided with a length equal to an integral number of times that of a compressed voice data unit and are allocated to radio frames.

33 Claims, 22 Drawing Sheets

| ID CODE | VOICE COMPRESSION DATA IDENTIFICATION CODE | DIGITAL VOICE COMPRESSION DATA |
|---|---|---|

| ID CODE | MESSAGE ID | DIVISION NUMBER | VOICE COMPRESSION DATA IDENTIFICATION CODE | DIGITAL VOICE COMPRESSION DATA |
|---|---|---|---|---|

3 BYTES

WHEN THERE IS NO TEXT MESSAGE
A B C = "0 0 0" A S C 1 1 CHARACTER
(3 0 h 3 0 h 3 0 h)

WHEN TEXT MESSAGE LENGTH RANGES FROM 1 TO 999
(MAXIMUM TEXT MESSAGE LENGTH IS 999 CHARACTERS)

A B C = "0 0 1 " ( IN CASE OF 1 CHARACTER)
(3 0 h 3 0 h 3 1 h)

A B C = "9 9 9" (IN CASE OF 999 CHARACTERS)
(3 9 h 3 9 h 3 9 h)

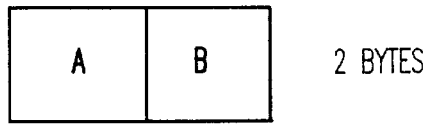

WHEN THERE IS NO VOICE MESSAGE
A B = "0 0" ASCII CHARACTER
(3 0 h 3 0 h)

WHEN REPRODUCTION TIME OF VOICE COMPRESSION DATA IS 1 SECOND TO 99 SECONDS (MAXIMUM TIME OF VOICE COMPRESSION DATA TO BE TRANSMITTED IS 99 SECONDS)
A B = "0 1 " ( IN CASE OF 1 SECOND)
(3 0 h 3 1 h)
A B = "9 9 " (IN CASE OF 99 CHARACTERS)
(3 9 h 3 9 h )

WHEN THERE IS VOICE COMPRESSION DATA BUT REPRODUCTION TIME IS NOT DEFINITE
A B = "X X"
(7 7 h 7 7 h)

FIG.14

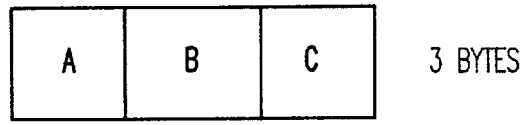

WHEN THERE IS NO SYSTEM POSSESSION VOICE DATA
A B C = "0 0 0" ASCII CHARACTER
(3 0 h 3 0 h 3 0 h)

WHEN SYSTEM POSSESSION VOICE DATA IS 1 SECOND TO 999 SECONDS

A B C = "0 0 1 " ASCII CHARACTER
(3 0 h 3 0 h 3 1 h)
A B C = "9 9 9" A S C 1 1 CHARACTERS
(3 9 h 3 9 h 3 9 h)

WHEN THERE IS SYSTEM POSSESSION VOICE DATA BUT REPRODUCTION TIME IS NOT DEFINITE
A B C = "X X X"
(7 7 h 7 7 h 7 7 h)

FIG.15

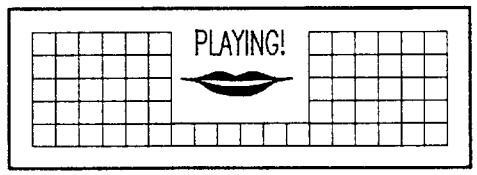
CLOSED MOUTH MARK
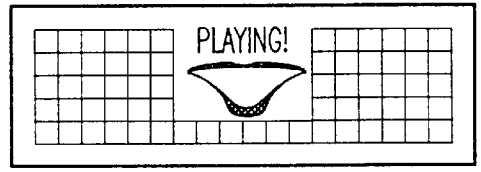
OPEN MOUTH MARK
FIG.22
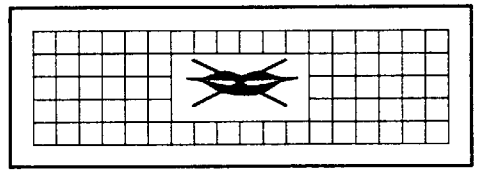
ERROR MARK
FIG.23
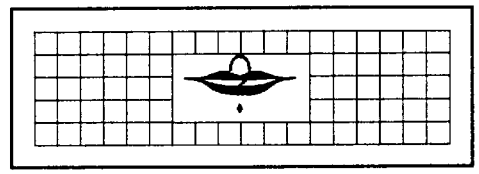
ERROR MARK
FIG.24

DISPLAY NUMBER OF SECONDS
OF MISSING AT X.X

ERROR MARK

DISPLAY NUMBER OF SECONDS
OF MISSING AT X.X

ERROR MARK xxx: SYSTEM POSSESSION REPRODUCTION TIME

YYYYY: IDENTIFICATION ID OF MESSAGE

YYYYY: IDENTIFICATION ID OF MESSAGE

DIGITAL VOICE TRANSMISSION SYSTEM

BACKGROUND OF THE INVENTION

1. Field of the Invention

This invention relates to a digital voice transmission system and more particularly to a digital voice transmission system wherein voice data to be transmitted are selected from requested voice data and the digital voice data are compressed and transmitted whereas the compressed data are decompressed and the voice is reproduced by a digital voice reproduction radio reception apparatus with a display unit.

2. Description of the Related Art

In a conventional digital voice transmission system, a voice message is digitized into and transmitted as binary data between the transmission side and the reception side. In a paging protocol such as the FLEX, since it has a binary data transfer function, a voice message is transmitted as binary data.

As shown in FIG. 1, data to be transmitted include an ID code for identification of a digital voice reproduction radio reception apparatus on the reception side, a voice compression data identification code for identification that the data to be transmitted are voice compression data, and digital voice compression data.

When the size of the voice compression data exceeds the amount which can be transmitted at one time, the voice compression data are divided and transmitted divisionally.

As shown in FIG. 2, data to be transmitted include an ID code for identification of a digital voice reproduction radio reception apparatus on the reception side, a message ID for identification of a message, a division number indicative of a number in order of a division, a voice compression data identification code for identification that the data to be transmitted are voice compression data, and digital voice compression data.

In the following, division of voice compression data by the digital voice transmission system described above is described.

Division of voice compression data is performed by compressing voice data of L bytes obtained by digital sampling and making an object of transmission and dividing data of K bytes obtained by the compression in units of an amount (M bytes here) which can be transmitted at one time as seen in FIG. 3. Then, the voice compression data obtained by the division are transmitted in the data format shown in FIG. 2 to a digital voice reproduction radio reception apparatus.

In the following, a digital voice reproduction radio reception apparatus employed in the digital voice transmission system described above is described.

The digital voice reproduction radio reproduction apparatus in the present conventional example includes, as shown in FIG. 4, reception antenna 120, reception circuit 121 for demodulating a signal received by reception antenna 120, decoder 122 for decoding the received data demodulated by reception circuit 121 and discriminating whether or not the decoded data are a signal destined for the radio apparatus itself, ID memory 123 in which an identification number of the radio apparatus is stored, RAM 124 for storing the received data, CPU 128, CPU program ROM 125 in which an operation program for CPU 128 is stored, DSP 129 for voice decompressing the voice compressed data, DSP program ROM 130 in which a program for operation of DSP 129 is stored, digital to analog converter (DAC) 131 for converting the digital voice signal into an analog voice signal, amplifier (AMP) 132 for amplifying the voice signal, band-pass filter (BFP) 133, loudspeaker (SPK) 134, and operation switch (SW) 135.

In the following, operation of constructing voice compression data when reception of divisional transmission data of the digital voice reproduction radio reception apparatus having the construction described above is missing is described.

The operation of constructing voice compression data when reception of divisional transmission data of the conventional digital voice reproduction radio reception apparatus is missing, will be explained below with reference to FIG. 5.

First, it is discriminated whether or not voice data received are a message destined for the apparatus itself (step S111).

If it is discriminated in step S111 that the received voice data are a message destined for the self apparatus, the number of the division received is placed into N (step S112).

Then, it is discriminated in step S112 whether or not the value of N into which the number of the division has been placed is 1 (step S113).

If it is discriminated in step S113 that N is 1, then since this signifies that the data received are new voice compression data (step S114), 1 is placed into M (step S115), and the received, divided voice compression data PartData are placed into VoiceData (step S116).

On the other hand, if it is discriminated in step S113 that N is not 1, then it is discriminated whether or not the current transmission is transmission of a division next to the last division number M received in the past (step S117), and if (N=M+1) stands, then it is discriminated that no division is missing (step S118) and the PartData are added to VoiceData (step S119). On the other hand, if (N=M+1) does not stand in step S117, then an error in reception is determined and the receiving operation is ended (step S120).

However, the operation of the conventional apparatus described above has such disadvantages as described below.

(1) Since an entire voice message inputted on the transmitter side of the voice message is voice compressed after digital sampling and then transmitted, the amount of information increases in proportion to the length of the voice message.

Here, a radio communication system having a low transmission rate such as a system for a paging service does not have a capacity sufficient to accept the capacity of digital voice data. For example, in a FLEX system or an ERMES system which is one of paging protocols, the transmission capacity is approximately 6,000 bps.

Therefore, it is considered that transmission of a long voice message or an increase of the number of times of origination to the receiver side increases the capacity of transmission data until it exceeds the transmission capacity of the system, and reduction in number of transmitters or a delay in transmission is invited inevitably.

(2) When transmitting digital voice data by a radio channel, an error or drop of data may possibly occur depending upon the state of the radio channel. In this instance, since the voice compressed data are handled as binary data, either it is impossible to restore data following the portion at which the drop of data has occurred into voice or the voice message is rendered discontinuous.

As a result, when the voice message is reproduced on the receiver side, the voice is produced but discontinuously and cannot be heard readily. Further, if reception of a voice data start code representative of the start of transmission of voice compression data misses, then reception of the voice compression data becomes impossible.

SUMMARY OF THE INVENTION

It is an object of the present invention to provide a digital voice transmission system which suppresses, even when a long voice message is to be transmitted, an increase of the transmission capacity of a radio channel and, even if a drop of a division of divisionally transmitted voice compression data occurs, it is prevented that the voice data becomes difficult to hear.

In order to attain the object described above, according to the present invention, a digital voice transmission system comprising:
  a voice storage type transmission apparatus for converting a voice message from a transmitter into digital voice data and outputting the digital voice data;
  a digital voice radio transmission apparatus for radio modulating and outputting the digital voice data outputted from said voice storage type transmission apparatus; and
  a digital voice reproduction radio reception apparatus with a display unit for receiving the digital voice data outputted from said digital voice radio transmission apparatus and reproducing voice from the digital voice data; that
  said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus; and
  said digital voice radio transmission apparatus including means for radio modulating and means for transmitting the voice data and the system possession voice data identification code outputted from said voice storage type transmission apparatus to said digital voice reproduction radio reception apparatus with a display unit.

A digital voice storage type transmission apparatus for use with a digital voice transmission system described above, comprising:
  telephone line connection means for establishing connection to said transmitter with a telephone line;
  an analog to digital conversion circuit for converting the voice message in the form of an analog signal transmitted by said telephone line into a digital signal;
  a digital to analog conversion circuit for outputting analog voice data to said telephone line connection means;
  voice data storage means in which digital voice data and system possession voice data identification codes for identification of the digital voice data are stored;
  a digital signal processing circuit for selecting and compressing only part of the digital voice data to produce digital voice compression data as data to be transmitted and outputting data stored in said voice data storage means to said digital to analog conversion circuit in response to an access from a receiver by said telephone line;
  a CPU for controlling operation of the entire apparatus;
  a CPU program memory in which an operation program for said CPU is stored; and
  transmission means for transmitting data to said digital voice radio transmission apparatus.

a digital voice radio transmission apparatus for use with a digital voice transmission system described above, comprising:
  inputting means for receiving data transmitted from said digital voice storage type transmission apparatus;
  an encoder for encoding the data received from said inputting means into data to be transmitted in a radio section;
  a transmission circuit for modulating the data encoded by said encoder;
  a transmission antenna for transmitting the data modulated by said transmission circuit to said digital voice reproduction radio reception apparatus with a display unit;
  a CPU for controlling operation of the entire apparatus; and
  a CPU program ROM in which an operation program for said CPU is stored.

a digital voice reproduction radio reception apparatus with a display unit for use with a digital voice transmission system comprising:
  a voice storage type transmission apparatus for converting a voice message from a transmitter into digital voice data and outputting the digital voice data;
  a digital voice radio transmission apparatus for radio modulating and outputting the digital voice data outputted from said voice storage type transmission apparatus; and
  a digital voice reproduction radio reception apparatus with a display unit for receiving the digital voice data outputted from said digital voice radio transmission apparatus and reproducing voice from the digital voice data,
  said voice storage type transmission apparatus including means for selecting only part of the digital voice data, means for applying, to the selected digital voice data, a system possession voice data identification code for identification of the digital voice data and means for transmitting the system possession voice data identificatiotheode together with selected digital voice data to said digital voice radio transmission apparatus, and
  said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit;
  an antenna for receiving data outputted from said digital voice radio transmission apparatus;
  a reception circuit for demodulating the data received by said antenna;
  a decoder for decoding the data demodulated by said reception circuit and discriminating whether or not the decoded data are destined for the apparatus itself;
  an ID memory in which an identification number of the self apparatus is stored;
  a received data memory for storing the received data;
  a digital signal processing circuit for processing voice compression data;

a display unit for displaying the received data;
a display unit controller for controlling operation of said display unit;
a CPU for storing data destined for the apparatus into a reception memory and transmitting a signal to said digital signal processing circuit;
a CPU program memory in which an operation program for said CPU is stored;
digital voice reproduction means for converting digital voice data processed by said digital signal processing circuit into an analog signal;
a voice amplification circuit for amplifying the voice data after conversion into an analog signal by said digital voice reproduction means;
a voice band-pass filter for band limiting the voice data amplified by said voice amplification circuit;
a loudspeaker for producing voice; and
an operation switch for switching the operation of said CPU; and that
particular displaying is performed by said display unit during reproduction of voice by said loudspeaker.

A digital voice storage type transmission apparatus for use with a digital voice transmission system described above, comprising:
means for transmitting data to said digital voice radio transmission apparatus;
said data including
system possession voice reproduction time information representative of a reproduction time of the voice data from said transmitter;
reproduction time information representative of a reproduction time of only the selected part of the digital voice compression data;
a system possession voice data identification code for identification of the voice data; and
digital voice compression data.

A digital voice radio transmission apparatus for use with a digital voice transmission system described above, comprising;
means for receiving data from said digital voice storage type transmission apparatus;
means for transmitting data to said digital voice reproduction radio reception apparatus with display;
said data including
system possession voice reproduction time information representative of a reproduction time of the voice data from said transmitter,
reproduction time information representative of a reproduction time of only the selected part of the digital voice compression data,
a system possession voice data identification code for identification of the voice data, and
digital voice compression data, and
transmits the received information to said digital voice reproduction radio reception apparatus with a display unit.

A digital voice reproduction radio reception apparatus with a display unit for use with a digital voice transmission system described above, comprising;
means for receiving data from said digital voice radio transmission apparatus;
said data including
system possession voice reproduction time information representative of a reproduction time of the voice data from said transmitter;
reproduction time information representative of a reproduction time of only the selected part of the digital voice compression data;
a system possession voice data identification code for identification of the voice data; and
digital voice compression data.

a digital video storage type transmission apparatus for use with a digital voice transmission system described above, comprising;
means for selecting, when the voice data from said transmitter are longer than a predetermined time, only the voice data in the predetermined time and means for transmitting the selected voice data to said digital voice radio transmission apparatus.

A digital voice transmission system comprising:
a voice storage type transmission apparatus for converting a voice message from a transmitter into digital voice data and outputting the digital voice data;
a digital voice radio transmission apparatus for radio modulating and outputting the digital voice data outputted from said voice storage type transmission apparatus; and
a digital voice reproduction radio reception apparatus with a display unit for receiving the digital voice data outputted from said digital voice radio transmission apparatus and reproducing voice from the digital voice data; that
said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus; and
said digital voice radio transmission apparatus including means for radio modulating and means for transmitting the voice data and the system possession voice data identification code outputted from said voice storage type transmission apparatus to said digital voice reproduction radio reception apparatus with a display unit; that
a data format to be transmitted includes some or all of
a radio apparatus identification code for designating a destination of transmission,
a message identification code representative of a message number,
a division number representative of a number in order of a division when a message is divided and transmitted divisionally,
a digital voice compression data identification code representative of transmission of digital voice compression data,
text message length information representative of a length of a following text message,
a text message,
reproduction time information representative of a voice reproduction time after decompression of digital voice compression data,
a system possession voice data identification code for identification of pertaining voice data possessed by the transmission side irrespective of whether or not radio transmission is employed,
system possession reproduction time information representative of a reproduction time of the system possession voice data,
a voice start code representative of the start of digital voice compression data, and digital voice compression data; and that the digital voice compression data are obtained by compressing digitally sampled voice data for each unit time determined in advance, and when radio digital voice transmission is performed divisionally, the voice compression data are divided with a length equal to an integral number of times that of a compressed voice data unit and allocated to radio frames.

A digital voice radio transmission apparatus for use with a digital voice transmission system described above, comprising means for transmitting the data format.

a digital voice radio reproduction radio reception apparatus with a display unit for use with a digital voice transmission system described above, comprising means for receiving the data format.

A digital voice transmission system described above, comprising the text message length information representative of the length of the following text message includes a code representing that there is no following text message.

A digital voice transmission system described above, comprising the reproduction time information representative of the voice reproduction time after decompression of the digital voice compression data includes a code representing that there is no following voice compression data.

A digital voice transmission system described above, comprising the reproduction time information representative of the voice reproduction time after decompression of the digital voice compression data includes a code representing that following voice compression data are present but no voice reproduction time information is present.

A digital voice transmission system described above, comprising the system possession reproduction time information representative of the reproduction time of the pertaining voice data possessed by the transmission side irrespective of whether or not radio transmission is employed includes a code representing that there is no system possession voice data.

A digital voice transmission system described above, comprising the system possession reproduction time information representative of the reproduction time of the pertaining voice data possessed by the transmission side irrespective of whether or not radio transmission is employed includes a code representing that system possession voice data are present but there is no system possession voice reproduction time information.

A digital voice reproduction radio reception apparatus with a display unit described above, comprising, means for inserting silence in place of a missing voice data when a divisional radio frame of the digital voice compression data divisionally transmitted by radio transmission is missing, and means for reproducing voice by said loudspeaker.

A digital voice reproduction radio reception apparatus with a display unit described above, comprising, means for inserting silence for a fixed time irrespective of the length of the missing voice data when some divisional radio frames of the digital voice compression data divisionally transmitted by radio transmission are successively missing, and means for reproducing voice by said loudspeaker.

A digital voice reproduction radio reception apparatus with a display unit described above, comprising, means for inserting silence for a fixed time and sound representative of missing irrespective of a length of the missing voice data when some divisional radio frames of the digital voice compression data divisionally transmitted by radio transmission are successively missing, and means for reproducing voice by said loudspeaker.

A digital voice reproduction radio reception apparatus with a display unit described above, comprising, means for displaying a mark representative of the missing of the voice data on said display unit for a fixed time irrespective of a length of the missing voice data at a timing of the missing voice data when a divisional radio frame of the digital voice compression data divisionally transmitted by radio transmission is missing.

A digital voice reproduction radio reception apparatus with a display unit for use with a digital voice transmission system comprising;

a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data, said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus, and said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit, an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that particular displaying including means for performing by said display unit during reproduction of voice by said loudspeaker; and that, means for inserting silence in place of the missing voice data when a divisional radio frame of the digital voice compression data divisionally transmitted by radio transmission is missing, and means for reproducing voice by said loudspeaker, and means for displaying a mark representative of the missing of the voice data on said display unit for a fixed time irrespective of a length of the missing voice data at a timing of the missing voice data.

A digital voice reproduction radio reception apparatus with a display unit for use with a digital voice transmission system comprising;

a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data, said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus, and said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit;

an antenna for receiving data outputted from said digital voice radio transmission apparatus;

a reception circuit for demodulating the data received by said antenna;

a decoder for decoding the data demodulated by said reception circuit and discriminating whether or not the decoded data are destined for the apparatus itself;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that particular displaying including means for performing by said display unit during reproduction of voice by said loudspeaker; that, means for inserting silence for a fixed time irrespective of a length of the missing voice data when some divisional radio frames of the digital voice compression data divisionally transmitted by radio transmission successively miss, and means for reproducing voice by said loudspeaker; and means for displaying a mark representative of the missing of the voice data on said display unit for a fixed time irrespective of a length of the missing voice data at a timing of the missing voice data when a divisional radio frame of the digital voice compression data divisionally transmitted by radio transmission is missing.

A digital voice reproduction radio reception apparatus with a display unit for use with a digital voice transmission system comprising a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data, said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus, and said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit;

an antenna for receiving data outputted from said digital voice radio transmission apparatus;

a reception circuit for demodulating the data received by said antenna;

a decoder for decoding the data demodulated by said reception circuit and discriminating whether or not the decoded data are destined for the self apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that particular displaying including means for performing by said display unit during reproduction of voice by said loudspeaker; that, means for inserting silence for a fixed time and sound representative of missing are inserted irrespective of a length of the missing voice data when some divisional radio frames of the digital voice compression data divisionally transmitted by radio transmission are successively missing, and means for reproducing voice by said loudspeaker; and means for displaying a mark representative of the missing of the voice data on said display unit for a fixed time irrespective of a length of the missing voice data at a timing of the missing voice data when a divisional radio frame of the digital voice compression data divisionally transmitted by radio transmission is missing.

A digital voice reproduction radio reception apparatus with a display unit described above, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

A digital voice reproduction radio reception apparatus with a display unit described above, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

A digital voice reproduction radio reception apparatus with a display unit described above, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

A digital voice reproduction radio reception apparatus with a display unit as set forth in claim 23, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

A digital voice reproduction radio reception apparatus with a display unit for use with a digital voice transmission system as set forth in claim 9, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a typical voice memory in which typical voice data are stored;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that means for displaying particular displaying by said display unit during reproduction of voice by said loudspeaker; and that means for reproducing the typical voice data by said loudspeaker when the reproduction time information represents that there is no following voice compression data.

A digital voice reproduction radio reception apparatus with a display unit for use with a digital voice transmission system described above, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a typical voice memory in which typical voice data are stored;

a digital signal processing circuit for processing voice compression data;

a display unit for displaying the received data;

a display unit controller for controlling operation of said display unit;

a CPU for storing data destined for the apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that means for displaying particular displaying by said display unit during reproduction of voice by said loudspeaker; and that means for reproducing the system possession reproduction time information or a display corresponding to the information on said display unit.

A digital voice reproduction radio reception apparatus with a display unit for use with a digital voice transmission system described above, comprising:

an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice;

an operation switch for switching the operation of said CPU; and an operation parameter memory in which operation parameters for selection of operation functions of said digital voice radio transmission apparatus are stored; that the operation parameters including a parameter for setting whether or not a displaying function based on the system possession reproduction time information is to be rendered operative; and that, means for no displaying the system possession reproduction time information formed, means for displaying one of either time information, absence of possession or presence of possession in response to the system possession reproduction time information when it is selected that the displaying is to be performed.

A digital voice reproduction radio reception apparatus with a display unit for use with a digital voice transmission system described above, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; and that, means for searching for a voice start code representative of a start of the digital voice compression data when it is discriminated that, from among the received data, text message length information representative of a length of the text message includes a data error by said decoder performs of and means for discriminating data received prior to the voice start code as a text message.

A digital voice reproduction radio reception apparatus with a display unit for use with a digital voice transmission system described above, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; and that, means for performing processing of received data following the stored place of the voice start code as the digital voice compression data when it is discriminated that, from among the received data, a voice start code representative of a start of the digital voice compression data includes a data error.

A digital voice reproduction radio reception apparatus with a display unit for use with a digital voice transmission system described above, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for the self apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; and that, means for setting the length of the text message to an allowable maximum value of said transmission system when it is discriminated that, from among the received data, text message length information representative of a length of the text message includes a data error and besides a voice start code representative of a start of the digital voice compression data is not detected, and means for performing processing of regarding received data divisionally transmitted following the designated start place of the digital voice compression data as the digital voice compression data.

In the digital voice transmission system having the construction described above, the digital voice storage type transmission apparatus selects only the part of the digital voice data requested to be transmitted from a transmitter, applies a system possession voice data identification code for identification of the digital voice data to the selected digital voice data and transmits the selected digital voice data together with the system possession voice data identification code. Consequently, even where the voice data requested from the transmitter is long, the transmission capacity of the radio section is not limited by the voice data.

Where the voice data requested are short, all of the voice data are transmitted, but where the voice data are long, all of the voice data can be extracted by accessing to the digital voice storage type transmission apparatus.

Meanwhile, in the digital voice reproduction radio reception apparatus with a display unit, if some voice compression data is missing, then silence for a fixed time is inserted irrespective of the length of the missing voice compression data. Consequently, difficulty in decoding caused by discontinuity of voice is reduced.

Further, in the digital voice reproduction radio reception apparatus, even if a start code of voice compression data cannot be detected, since reception can be restored intermediately of the voice compression data, the influence upon a radio channel can be minimized and effective restoration of transmission data is possible.

Further, in such a case that it is estimated that the transmission rate of a radio channel may exceed the transmission capacity, by setting the voice reproduction time to "0", typical voice the voice data of which are stored in the digital voice reproduction radio reception apparatus with a display unit is reproduced so that the attention of the receiver may be called to accessing to the digital voice storage type transmission apparatus.

Since the present invention has such a construction as described above, the following effects are presented.

(1) In the digital voice storage type transmission apparatus, part of a voice message from a transmitter is selected and transmitted and a system possession reproduction time and a message identification number are transferred, and then, when a receiver accesses the digital voice storage type transmission apparatus based on information displayed on the digital voice reproduction radio reception apparatus with a display unit, the voice message is transmitted to the receiver. Consequently, even when long voice data are transmitted by the transmitter, the increase in transmission capacity of the transmission line is suppressed small, and accordingly, the allowable number of transmitters and the length of voice data can be increased.

(2) When voice compression data are divisionally transmitted, since silence data indicating a division is inserted at each location of such division irrespective of the amount of divisions, even if the voice compression data transmitted divisionally suffer from missing in a division, voice reproduced based on the voice compression data can still be heard well.

(3) Since a block including an integral number of times a compression unit of voice is used as a unit for divisional transmission, even if some division transmission is not received, voice decompression of next division transmission data is not influenced by the failure of reception.

Consequently, voice compression data transmitted to a radio channel can be received efficiently, and the influence of a state of the radio channel can be suppressed to the minimum.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIG. 14 is a diagrammatic view illustrating a form of reproduction time information in the digital voice transmission system of the present invention;

FIG. 15 is a diagrammatic view illustrating a form of system possession reproduction time information in the digital voice transmission system of the present invention;

FIG. 22 is a diagrammatic view showing a form of display contents representing that voice reproduction by the digital voice reproduction radio reception apparatus with a display unit of the present invention is proceeding;

FIG. 23 is a diagrammatic view showing a form of display contents for displaying missing when reception of divided transmission data by the digital voice reproduction radio reception apparatus with a display unit of the present invention is missing;

FIG. 24 is a diagrammatic view showing another form of display contents for displaying missing when reception of divided transmission data by the digital voice reproduction radio reception apparatus with a display unit of the present invention is missing;

DETAILED DESCRIPTION OF THE PREFERRED EMBODIMENTS

Figures 1, 2, 3:
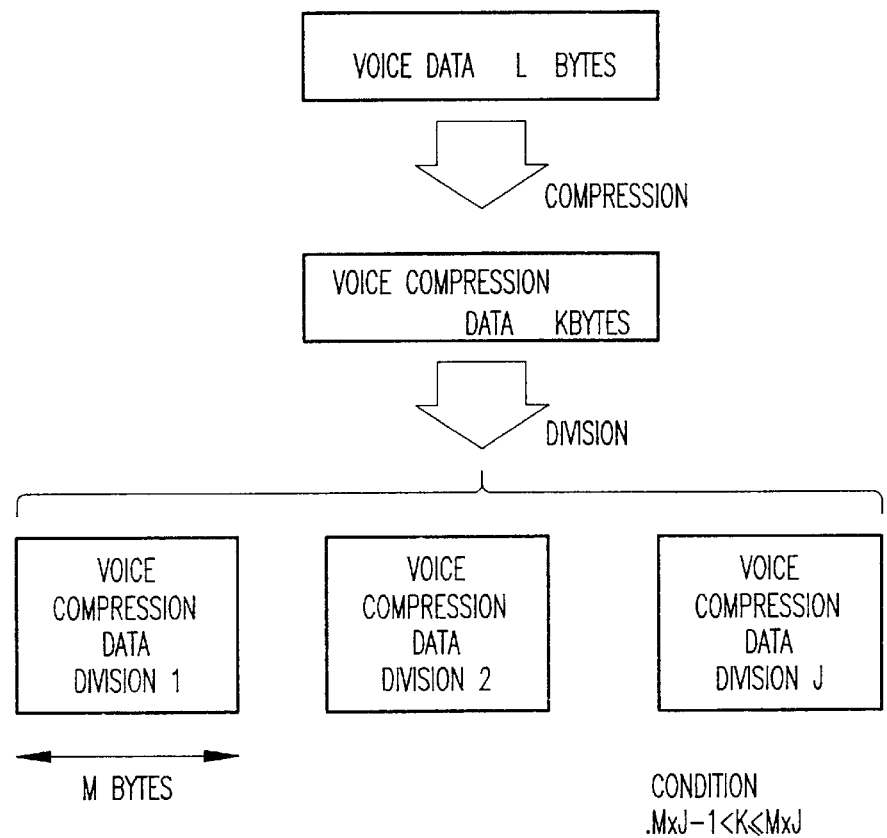
FIG. 1 is a diagrammatic view showing an example of a construction of a transmission data format in a conventional digital video transmission system.
FIG. 2 is a diagrammatic view showing a representative example of a construction of a transmission data format in a digital voice transmission system which effects divisional transmission.
FIG. 3 is a diagrammatic view illustrating an example of a dividing method of voice compression data in a conventional digital voice transmission system.
Figure 4:
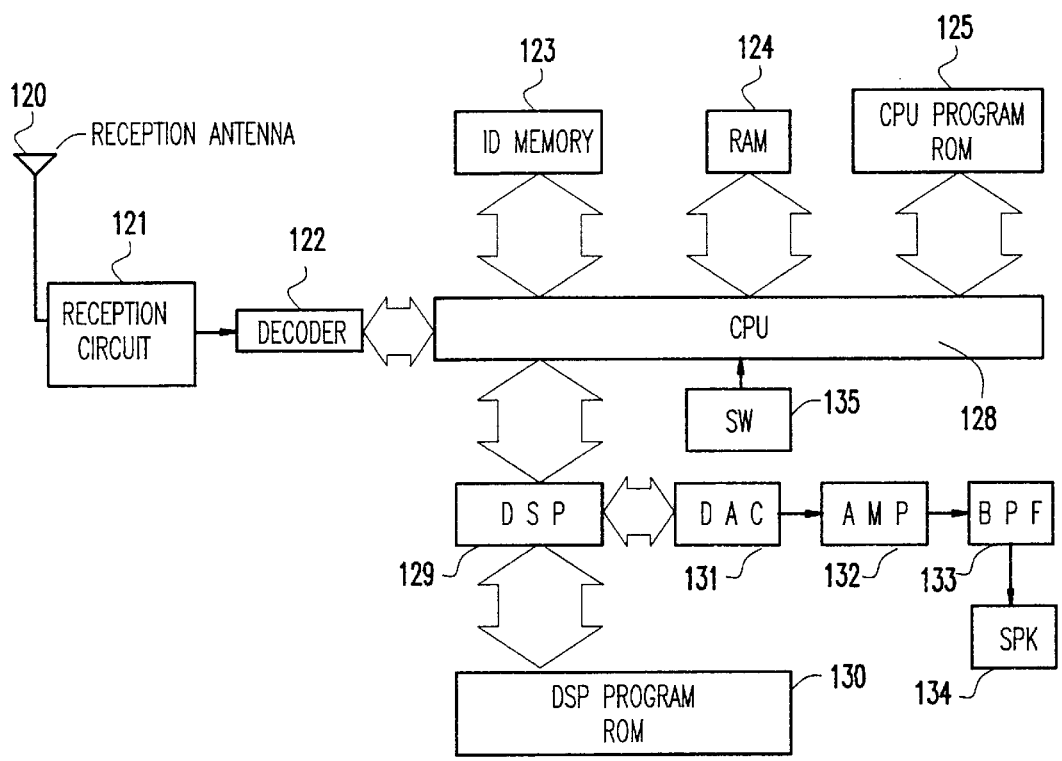
FIG. 4 is a block diagram showing an example of a construction of a digital video reproduction radio reception apparatus employed in a conventional digital voice transmission system.
Figure 5:
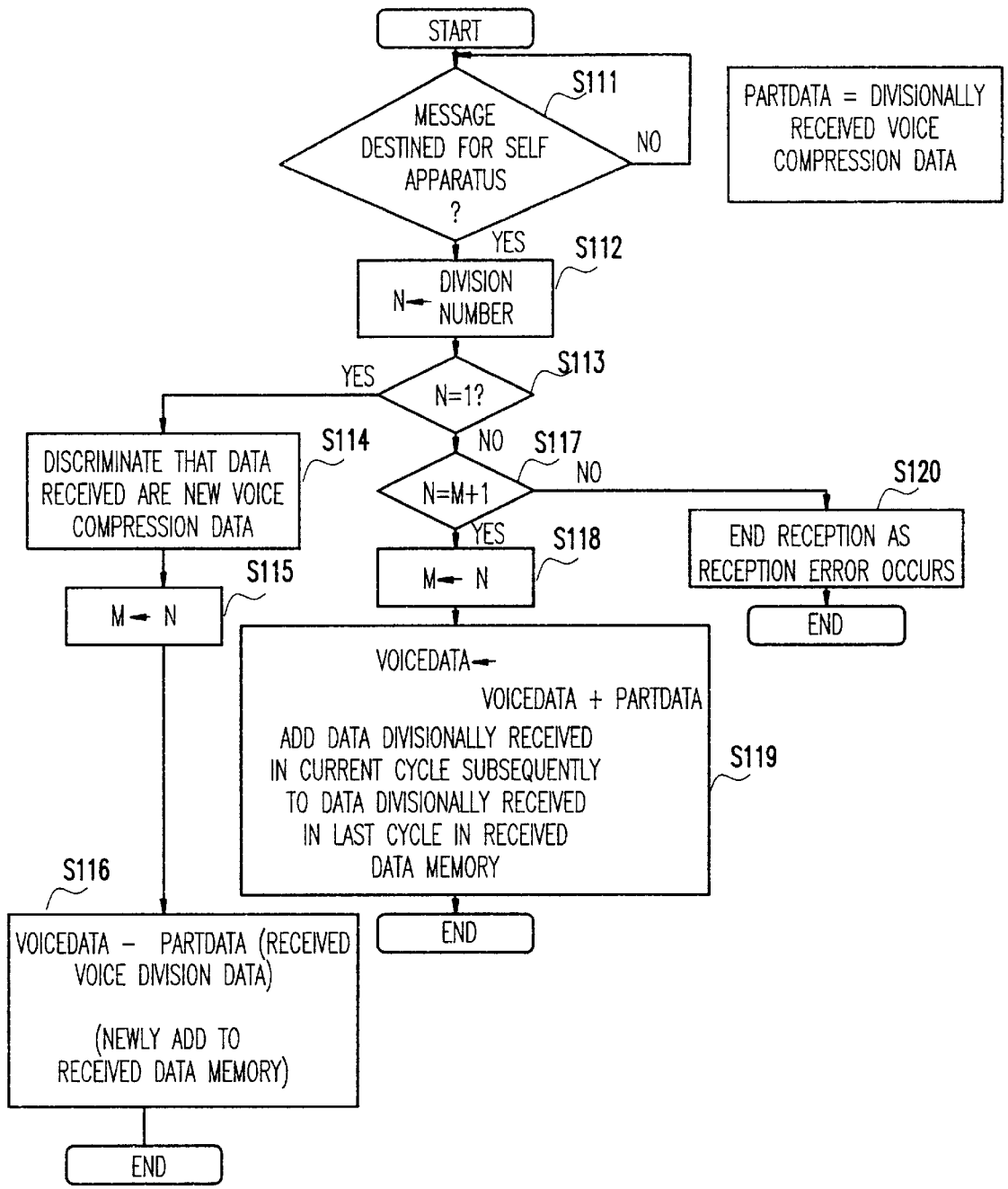
FIG. 5 is a flow chart illustrating a voice compression data constructing operation of the conventional digital voice transmission system when reception of transmission data of a division is missing.
Figure 6:
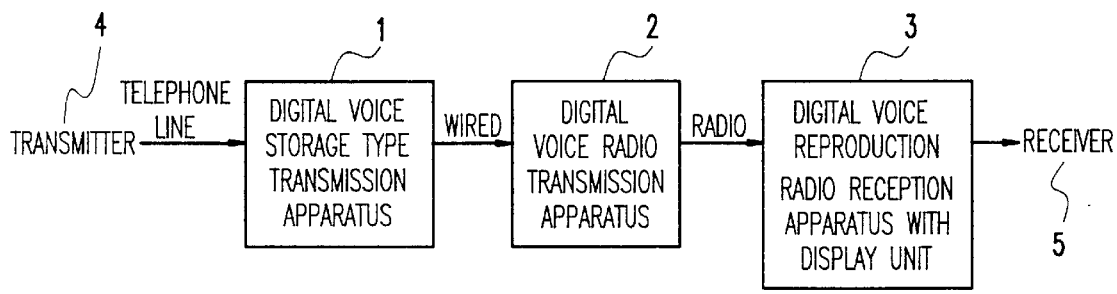
FIG. 6 is a block diagram showing an embodiment of a digital voice transmission system of the present invention.

As shown in FIG. 6, the present embodiment includes digital voice storage type transmission apparatus 1 which converts a voice message from transmitter 4 into digital voice data, selects only part of the digital voice data, adds a system possession voice data identification code for identification of the digital voice data to the selected part and outputs the selected part together with the system possession voice data identification code, digital voice radio transmission apparatus 2 for radio modulating and outputting the digital voice data outputted from digital voice storage type transmission apparatus 1, and digital voice reproduction radio reception apparatus with a display unit 3 for receiving the digital voice data outputted from digital voice radio transmission apparatus 2 and reproducing voice from the digital voice data.

Figure 7:
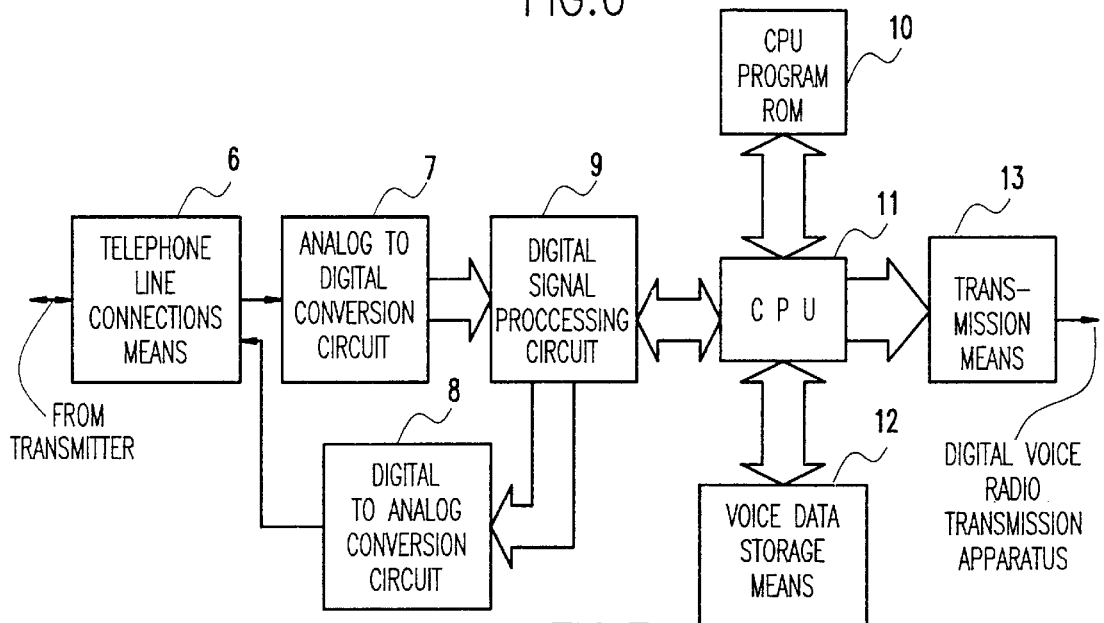
FIG. 7 is a block diagram showing an example of a construction of a digital voice storage type transmission apparatus shown in FIG. 6.

The digital voice storage type transmission apparatus in the present embodiment includes, as shown in FIG. 7, telephone line connection section 6 for establishing connection to transmitter 4 with a telephone line, analog to digital conversion circuit 7 for converting a voice message in the form of an analog signal transmitted by the telephone line into a digital signal, digital to analog conversion circuit 8 for outputting analog voice data to telephone line connection section 6, voice data storage section 12 in which digital voice data and system possession voice data identification codes for identification of the digital voice data are stored, digital signal processing circuit 9 for selecting and compressing only part of the digital voice data to produce digital voice compression data as data to be transmitted and outputting data of voice data storage section 12 to digital to analog conversion circuit 8 in response to an access from a receiver by the telephone line, CPU 11 for controlling operation of the entire apparatus, CPU program ROM 10 in which an operation program for CPU 11 is stored, and transmission section 13 for transmitting data to digital voice radio transmission apparatus 2.

Figure 8:
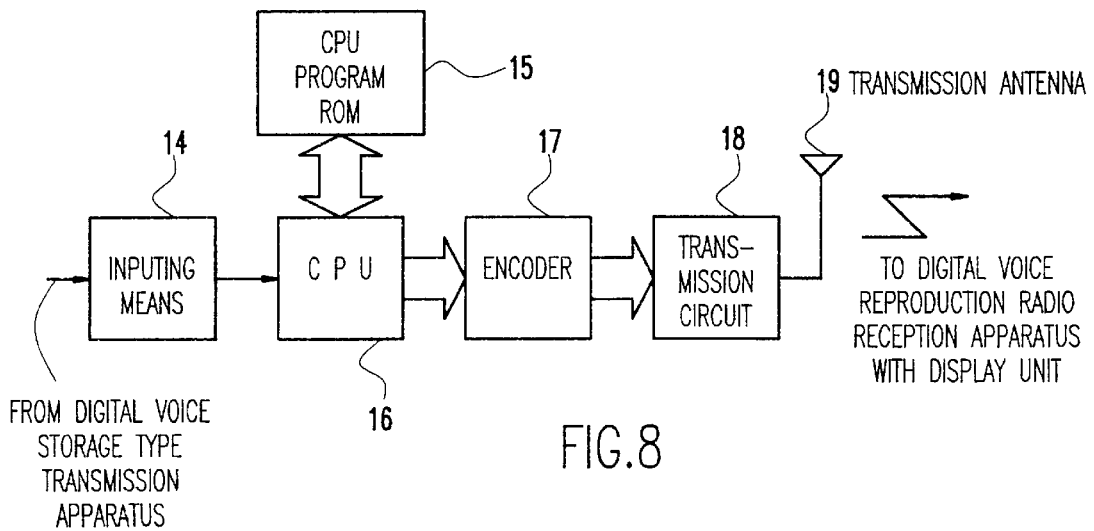
FIG. 8 is a block diagram showing an example of a construction of a digital voice radio transmission apparatus shown in FIG. 6.

The digital voice radio transmission apparatus in the present embodiment includes, as shown in FIG. 8, inputting section 14 for receiving data transmitted from digital voice storage type transmission apparatus 1, encoder 17 for encoding the data received from inputting section 14 into data for transmission in a radio section, transmission circuit 18 for modulating the data encoded by encoder 17, transmission antenna 19 for transmitting the data modulated by transmission circuit 18 to digital voice reproduction radio reception apparatus 3 with a display unit, CPU 16 for controlling operation of the entire apparatus, and CPU program ROM 15 in which an operation program for CPU 16 is stored.

Figure 9:
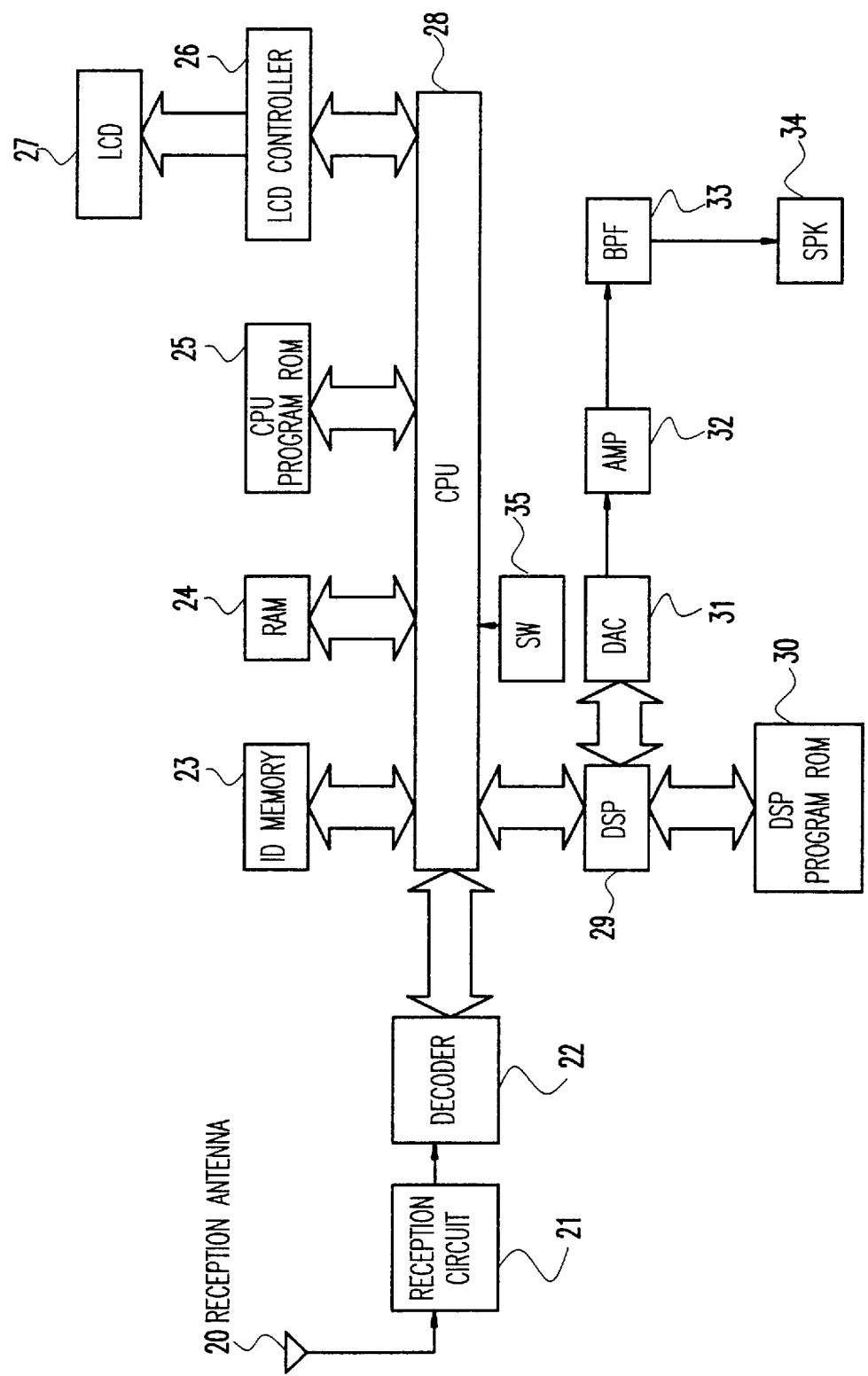
FIG. 9 is a block diagram showing an example of a construction of a digital voice reproduction radio reception apparatus with a display unit shown in FIG. 6.

The digital voice reproduction radio reception apparatus with a display unit in the present embodiment includes, as shown in FIG. 9, antenna 20 for receiving digital voice compression data transmitted from digital voice radio transmission apparatus 2, reception circuit 21 for demodulating the data received by antenna 20, decoder 22 for decoding the data demodulated by reception circuit 21 and discriminating whether or not the decoded data are destined for the apparatus itself, ID memory 23 in which an identification number of the self apparatus is stored, received data memory 24 for storing the received data, digital signal processing circuit 29 for decompressing the voice compression data and outputting the decompressed data to digital voice reproduction means 31, display unit 27 for displaying contents of the received data, display unit controller 26 for controlling operation of display unit 27, CPU 28 for storing data destined for the apparatus into a reception memory and transmitting a signal to digital signal processing circuit 29, CPU program memory 25 in which an operation program for CPU 28 is stored, digital voice reproduction means 31 for converting digital voice data processed by digital signal processing circuit 29 into an analog signal, voice amplification circuit 32 for amplifying the voice data after conversion into an analog signal by digital voice reproduction means 31, voice band-pass filter 33 for band limiting the voice data amplified by voice amplification circuit 32, loudspeaker 34 for producing voice, and operation switch 35 for switching the operation of CPU 28.

Figure 10:
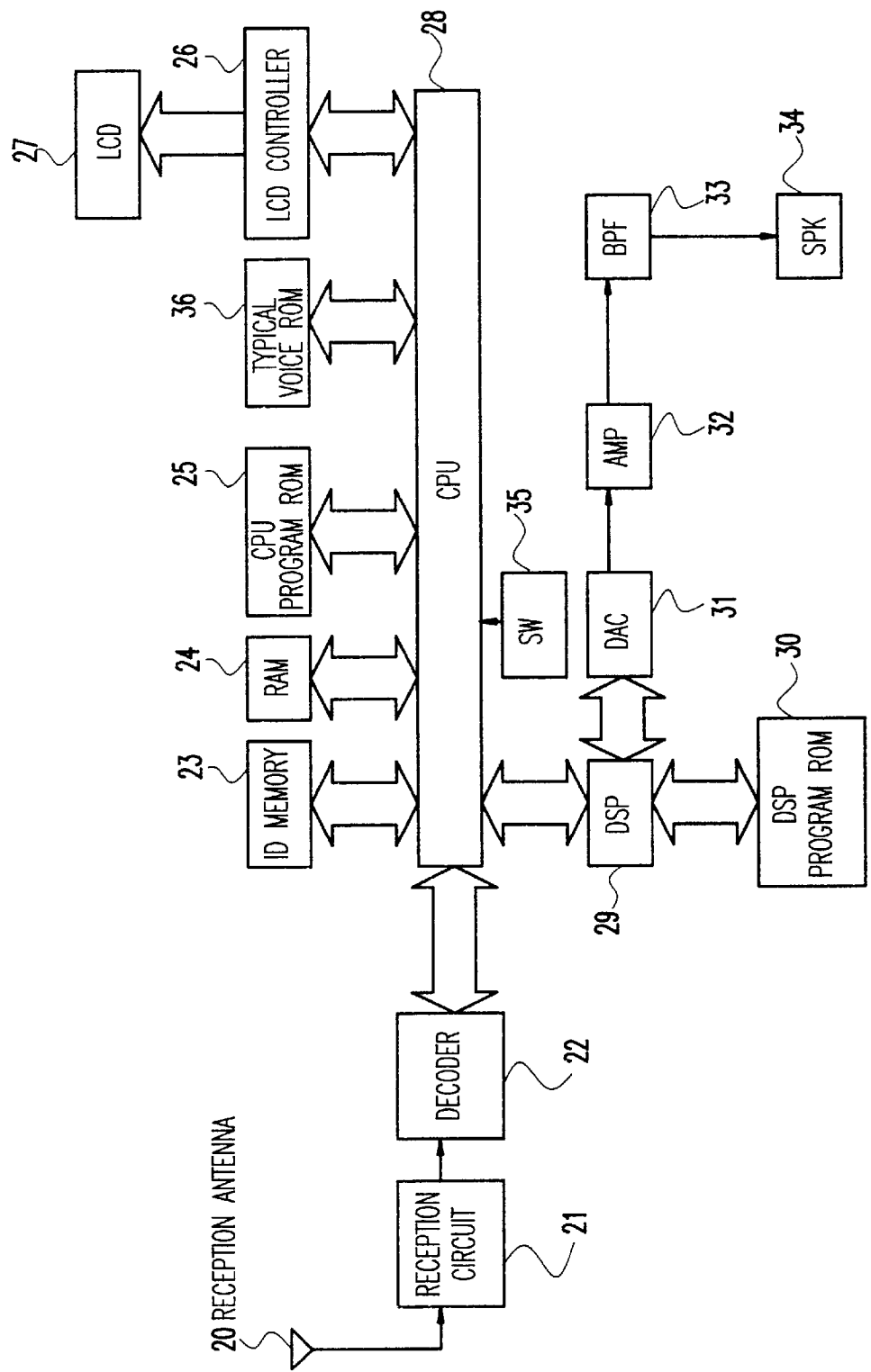
FIG. 10 is a block diagram showing another example of a construction of the digital voice reproduction radio reception apparatus with a display unit shown in FIG. 6.

The apparatus shown in FIG. 10 is similar to the apparatus shown in FIG. 9 except that it additionally includes typical voice memory 36 in which typical voice data are stored.

Figure 11:
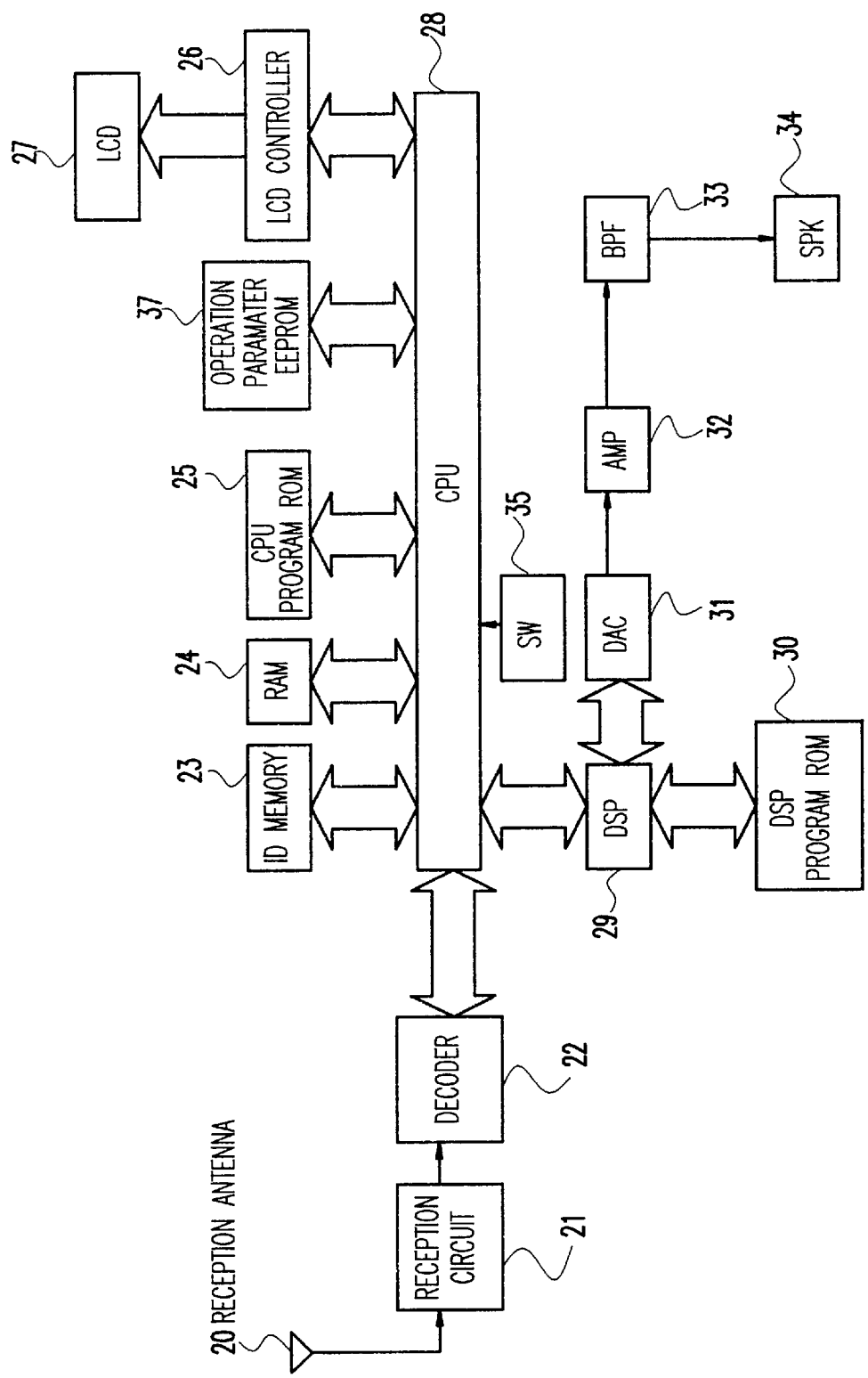
FIG. 11 is a block diagram showing a further example of a construction of the digital voice reproduction radio reception apparatus with a display unit shown in FIG. 6.

The apparatus shown in FIG. 11 is similar to that shown in FIG. 9 except that it additionally includes operation parameter EEPROM 37 in which parameters for selection of operation functions of the voice reproduction radio apparatus are stored.

Figure 12:
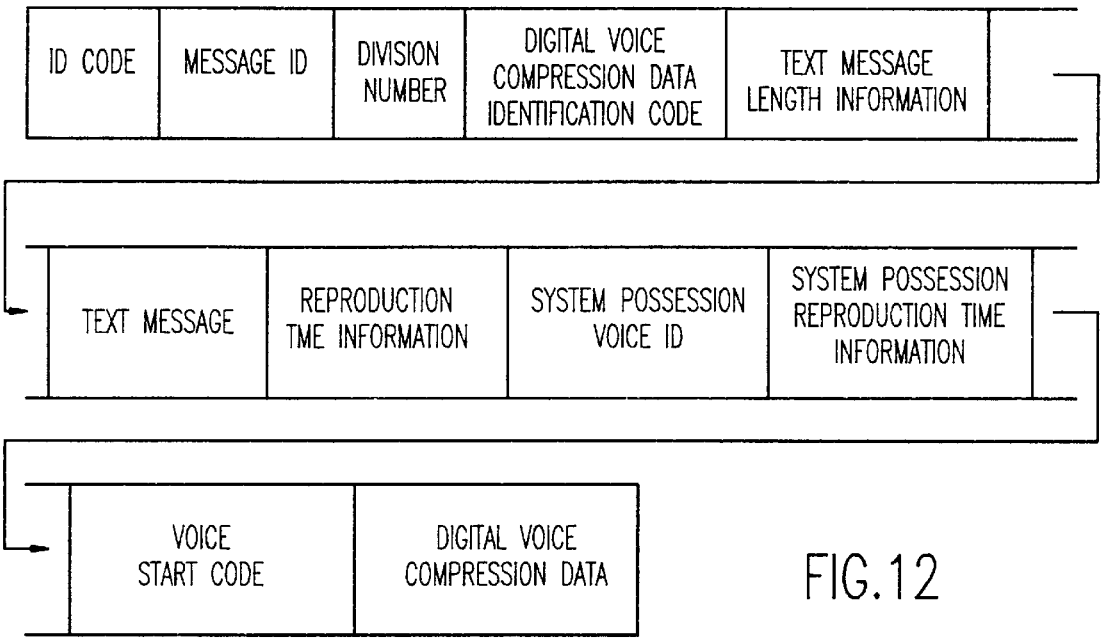
FIG. 12 is a diagrammatic view illustrating a form of a transmission data format in the digital voice transmission system of the present invention.

The transmission format in the present form includes, as shown in FIG. 12, a radio apparatus identification code (ID code) for designating a destination of transmission, a message ID code representative of a message number, a division number representative of a number in order of a division when a message is divided and transmitted divisionally, a digital voice compression data identification code representative of transmission of digital voice compression data, text message length information representative of the length of a following text message, a text message, reproduction time information representative of a voice reproduction time after decompression of digital voice compression data, a system possession voice data identification code for identification of pertaining voice data possessed by the transmission side irrespective of whether or not radio transmission is employed, system possession reproduction time information representative of a reproduction time of system possession voice data, a voice start code representing the start of digital voice compression data, and digital voice compression data.

Figure 13:
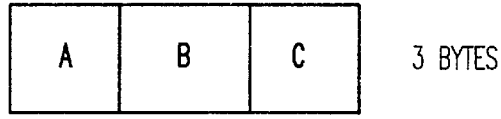
FIG. 13 is a diagrammatic view illustrating a form of text message length information in the digital voice transmission system of the present invention.

The text message length information in the present form represents, as shown in FIG. 13, a text message length in the form of an ASCII code of three figures, and the message length which can be represented ranges from 1 figure to 999 figures. Further, when there is no message, "000" is transmitted.

The reproduction time information in the present form represents, as seen in FIG. 14, a reproduction time after decompression of voice compression data in the form of an ASCII code of two figures, and the message length which can be represented ranges from 1 second to 99 seconds. Further, when voice compression data are not to be transmitted, "00", is transmitted.

The system possession reproduction time information in the present form represents, as seen in FIG. 15, a reproduction time of voice data possessed by the digital voice storage type transmission apparatus in the form of an ASCII code of three figures, and the message length which can be represented ranges from 1 second to 999 seconds. Further, when no voice data are possessed, "000" is transmitted, but when voice data are possessed but a reproduction time is not to be transmitted, "xxx" is transmitted.

In the following, processing operation of the digital voice transmission system having the construction described above will be described.

First, an operation of producing transmission voice data of the digital voice storage type transmission apparatus is described.

A form of an operation of producing transmission voice data of the digital voice storage type transmission apparatus of the present invention, will be explained below with reference to FIG. 6.

First, the digital voice storage type transmission apparatus compares the length of a voice message received from a transmitter with a transmission allowable maximum reproduction time of T seconds determined in advance for the entire digital voice transmission system (step S1).

If it is discriminated in step S1 that the length of the voice message from the transmitter is shorter than T seconds, then all of the voice message requested from the transmitter is transmitted to the digital voice radio transmission apparatus 2 (refer to FIG. 6) (step S2).

On the other hand, if it is discriminated in step S1 that the length of the voice message from the transmitter is longer than T seconds, then only data of the voice message for T seconds beginning with the top of the voice message are transmitted to the digital voice radio transmission apparatus 2 (refer to FIG. 6) (step S3).

Next, a method of dividing transmission data by the digital voice transmission system of the present invention is described.

A form of a method of dividing transmission data by the digital voice transmission system of the present invention, will be explained below with reference to FIG. 17.

Figure 16:
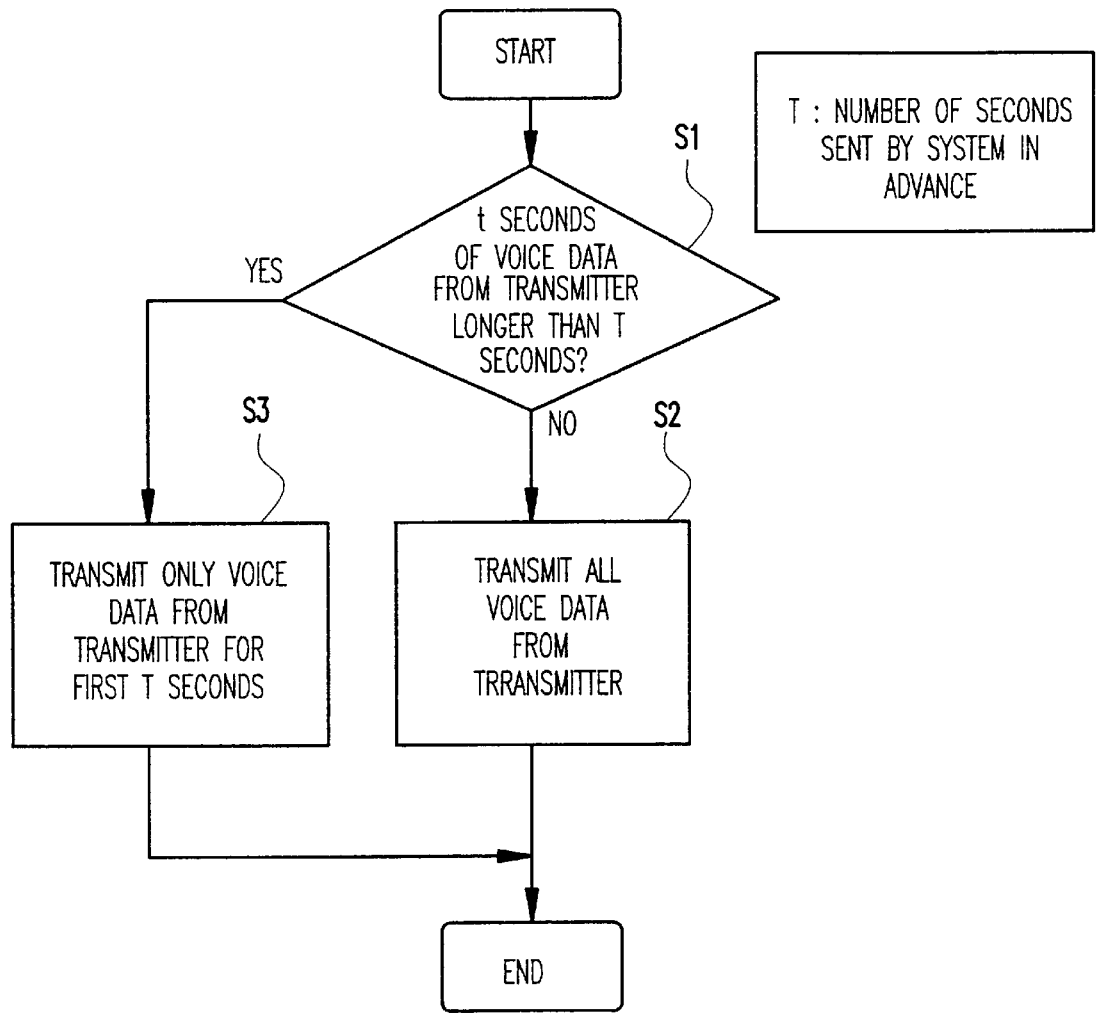
FIG. 16 is a flow chart illustrating a form of a production operation of transmission voice data of the digital voice storage type transmission apparatus of the present invention.

First, digital voice data (L bytes) selected by the operation illustrated in FIG. 16 are divided into voice data units (M bytes) which are units for which compression is performed.

Then, the voice data units obtained by the division are compressed individually into voice compression data units. The transmission data are transmitted as blocks each including an integral number of (K) times of a voice compression data unit so that the compressed data may be decompressed in the individual division transmissions. The division number (J) is represented by the following expression:

$$M \times (N-1) < L <= M \times N$$
$$K \times (J-1) < N <= K \times J$$

Next, an operation of constructing voice compression data by the digital voice reproduction radio reception apparatus with a display unit of the present invention when reception of division transmission data is missing is described.

A form of an operation of constructing voice compression data by the digital voice reproduction radio reception apparatus with a display unit of the present invention when reception of division transmission data is missing, will be explained below with reference to FIG. 18.

Figure 17:
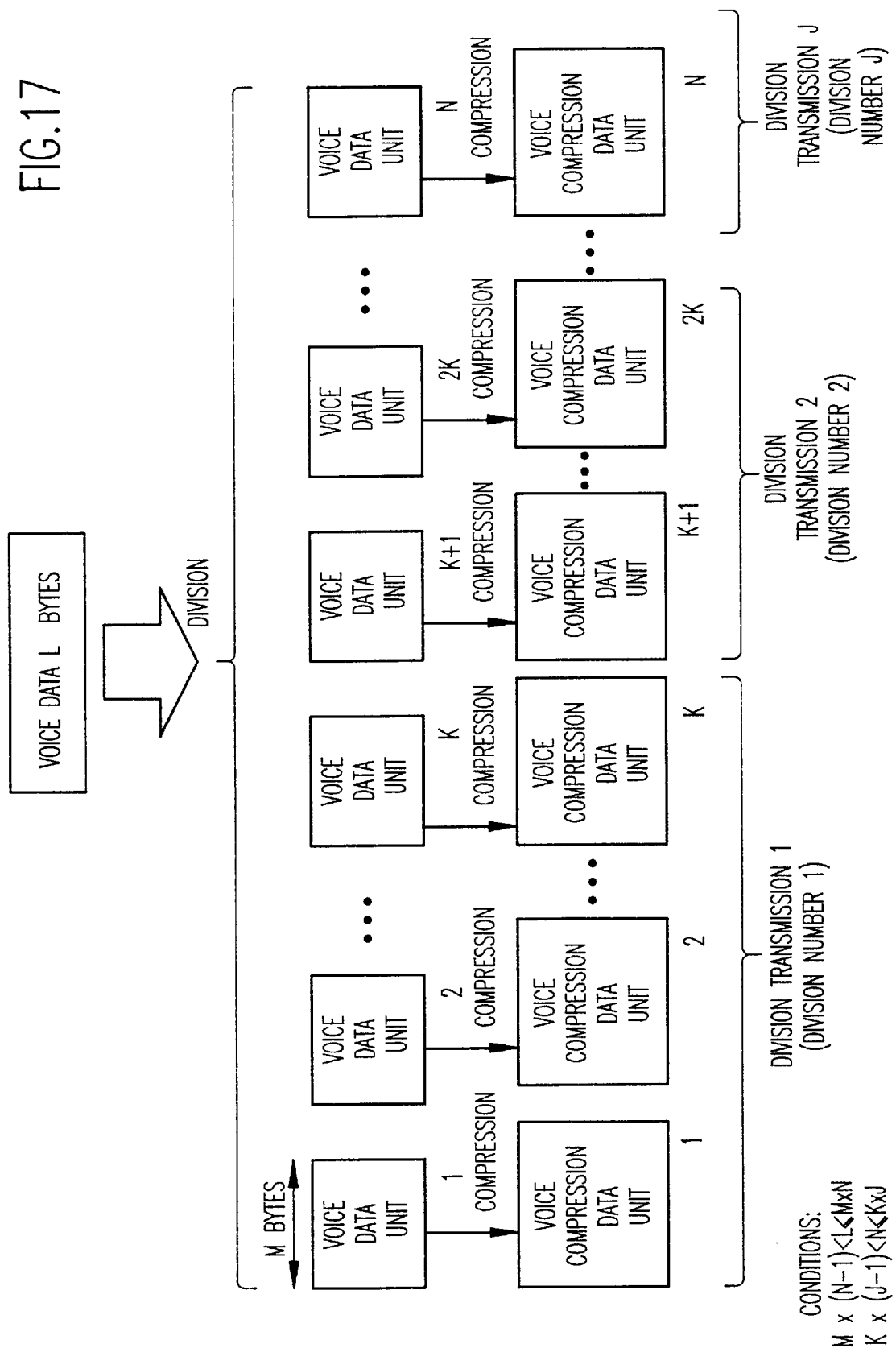
FIG. 17 is a diagrammatic view illustrating a form of a dividing method for transmission data of the digital voice transmission system of the present invention.

When voice compression data divided by the operation illustrated in FIG. 17 are received by the digital voice reproduction radio reception apparatus with a display unit, it is first discriminated whether or not the received voice compression data are a message destined for the apparatus itself (step S11).

If it is discriminated in step S11 that the received voice compression data are a message destined for the apparatus, the received division number is placed into N (step S12).

Then, it is discriminated whether or not the value of N into which the division number has been placed in step S12 is 1 (step S13).

If it is discriminated in step S13 that N is 1, then since this signifies that new voice compression data are to be received (step S14), 1 is placed into M (step S15), and the received, divided voice compression data PartData are placed into VoiceData (step S16).

On the other hand, if it is not discriminated in step S13 that N is 1, then it is discriminated whether or not the current transmission is transmission of a division next to the last division number M received in the past (step S17), and if (N=M+1) stands, then it is discriminated that no division is missing (step S18) and PartData are added to VoiceData (step S19).

On the other hand, if (N=M+1) does not stand in step S17, then it is determined that a division is missing (step S20), and silence data SilentData are added in place of the missing voice data (step S21).

It is to be noted that addition of the silence data is performed repetitively for missing divisions.

Another form of an operation of constructing voice compression data by the digital voice reproduction radio reception apparatus with a display unit of the present invention when reception of division transmission data is missing, will be explained below with reference to FIG. 19.

Figure 18:
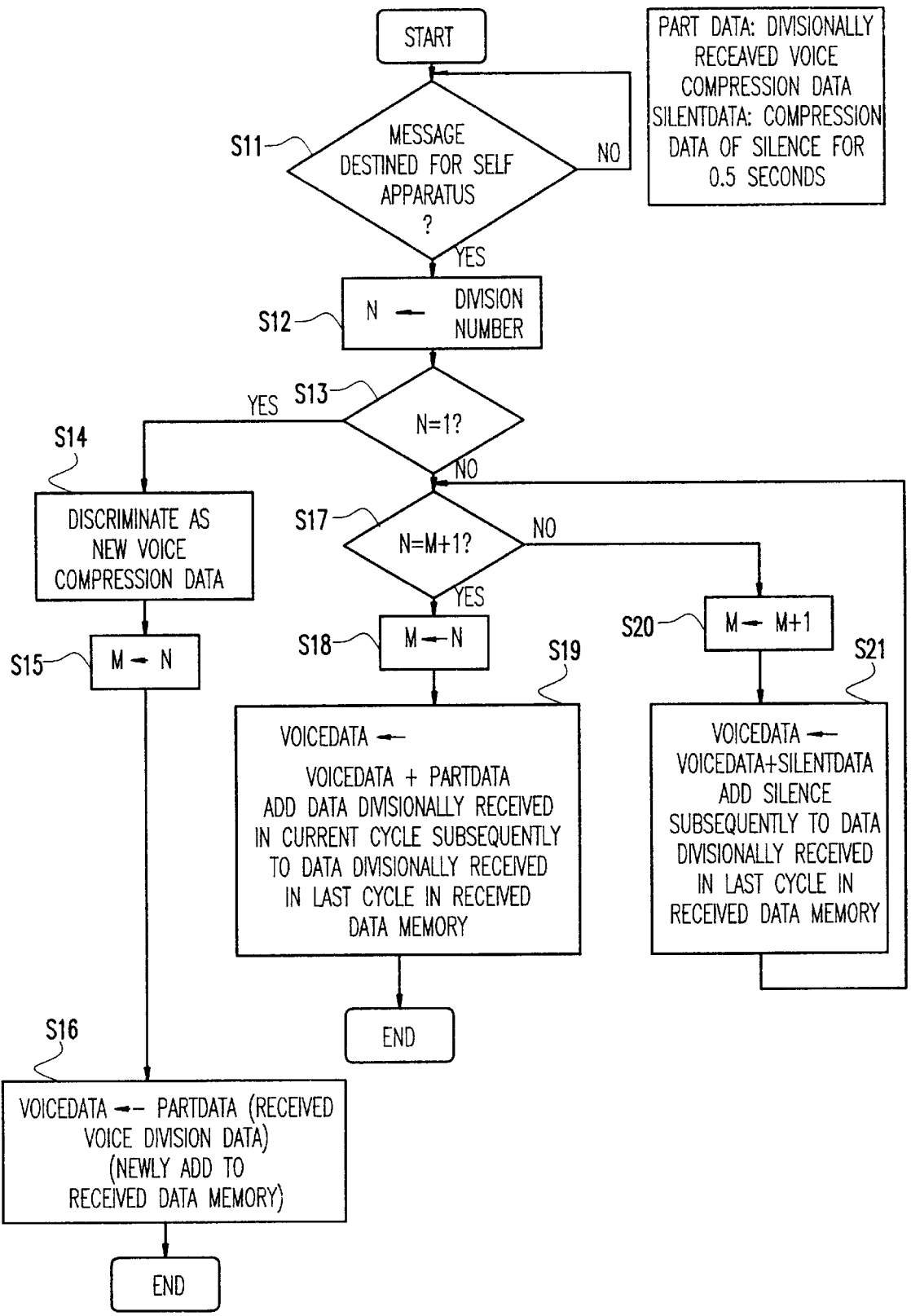
FIG. 18 is a flow chart illustrating a form of an operation for construction of voice compression data of the digital voice reproduction radio reception apparatus with a display unit of the present invention when reception of divided transmission data is missing.
Figure 19:
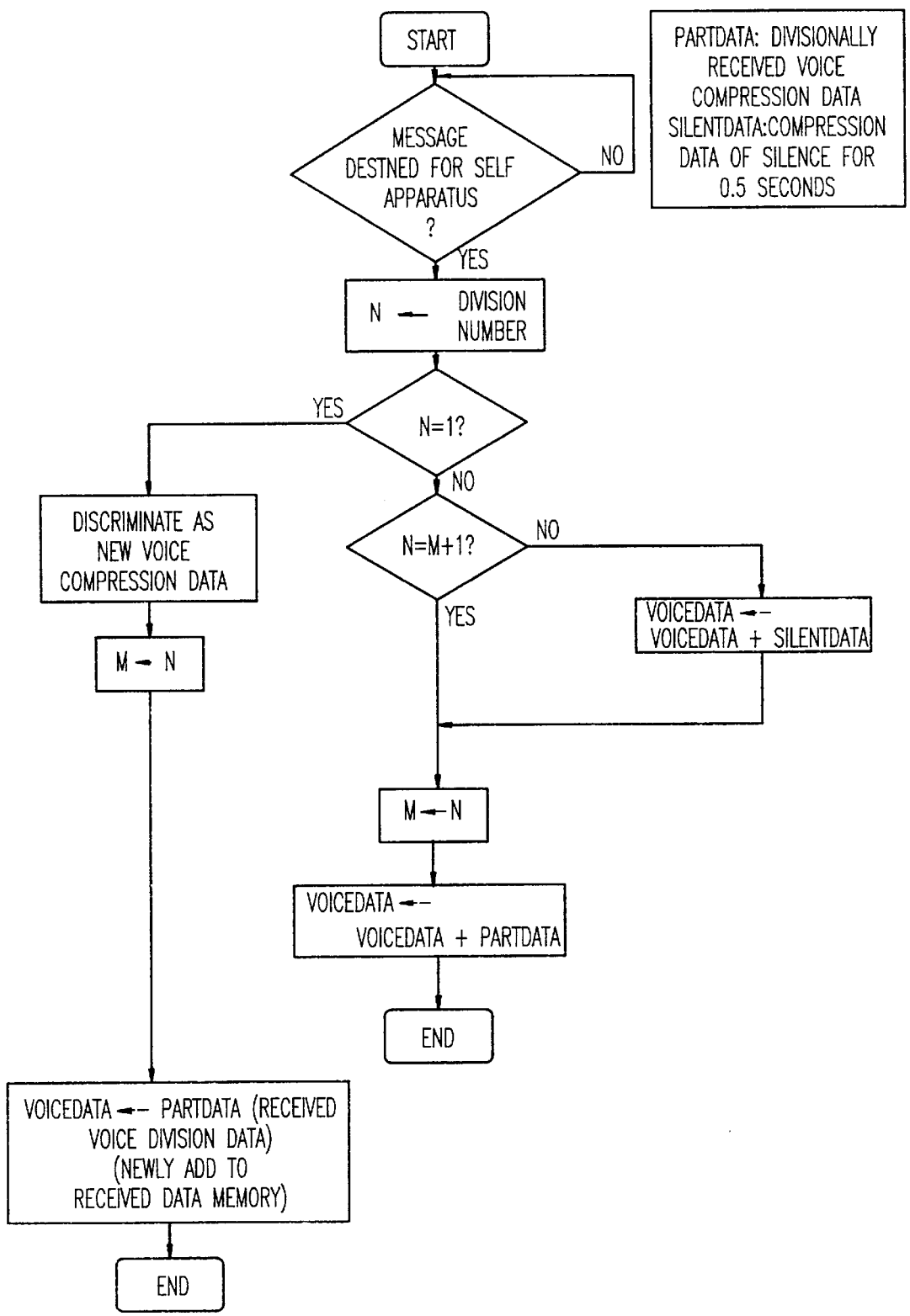
FIG. 19 is a flow chart illustrating another form of an operation for construction of voice compression data of the digital voice reproduction radio reception apparatus with a display unit of the present invention when reception of divided transmission data is missing.

While, in the operation illustrated in FIG. 18, addition of silence data is repetitively performed for missing divisions, in the operation illustrated in FIG. 19, a fixed amount of silence data are added irrespective of the amount of missing divisions. The other part of the operation is similar to that illustrated in FIG. 18.

A further form of an operation of constructing voice compression data by the digital voice reproduction radio reception apparatus with a display unit of the present invention when reception of division transmission data is missing, will be explained below with reference to FIG. 20.

Figure 20:
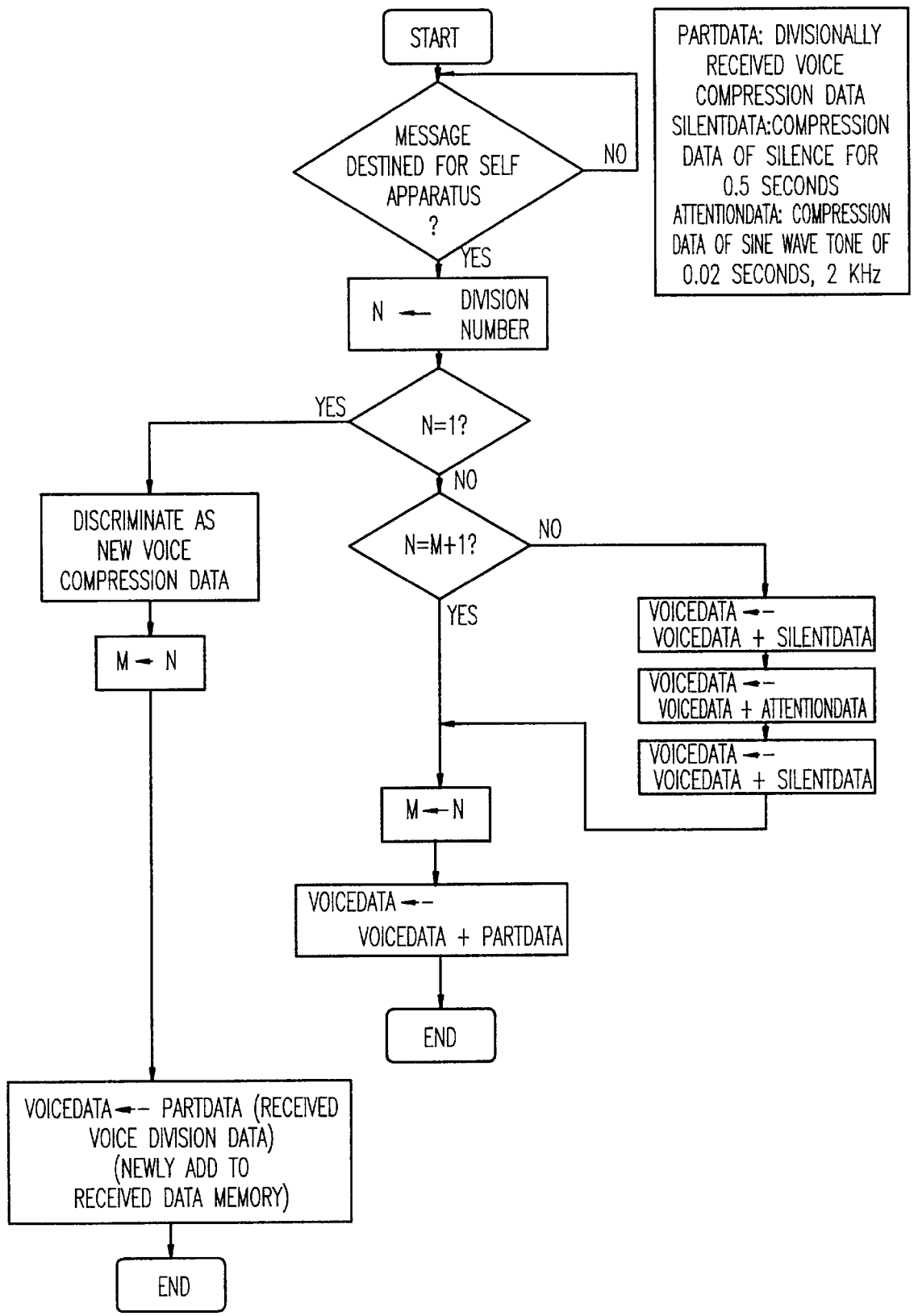
FIG. 20 is a flow chart illustrating a further form of an operation for construction of voice compression data of the digital voice reproduction radio reception apparatus with a display unit of the present invention when reception of divided transmission data is missing.

While, in the operation illustrated in FIG. 19, a fixed amount of silence data is added irrespective of the amount of missing divisions, in the operation illustrated in FIG. 20, a tone is inserted once within a silent period in place of silence data. The other part of the operation is similar to that illustrated in FIG. 19.

Next, an operation for displaying missing by the digital voice reproduction radio reception apparatus with a display unit of the present invention when reception of division transmission data is missing is described.

Figure 21:
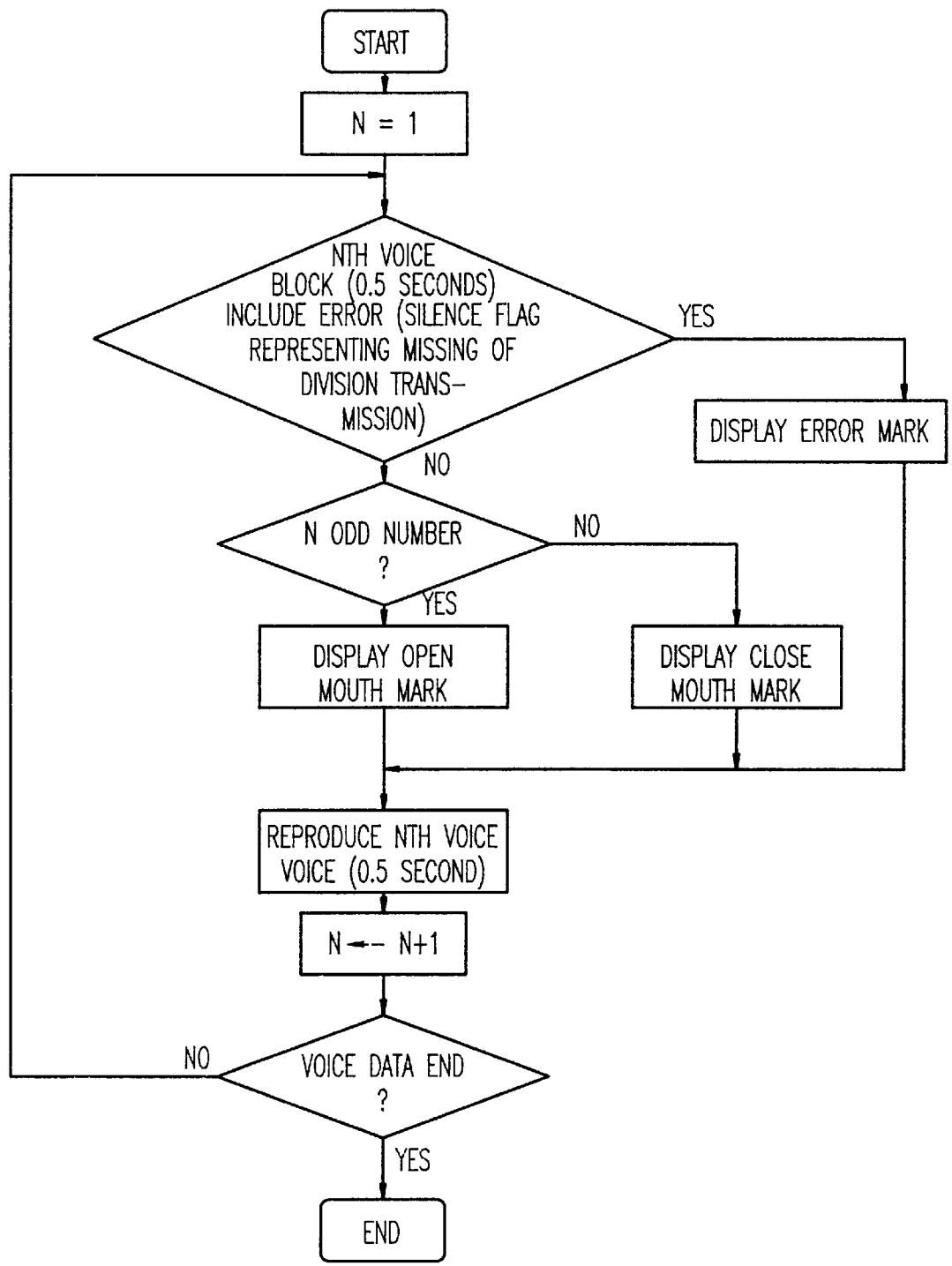
FIG. 21 is a flow chart illustrating a form of operation of the digital voice reproduction ratio reception apparatus with a display unit for displaying missing when reception of divided transmission data of the digital voice reproduction radio reception apparatus with a display unit of the present invention when reception of divided transmission data is missing.

A form of an operation for displaying missing by the digital voice reproduction radio reception apparatus with a display unit of the present invention when reception of division transmission data is missing, will be explained below with reference to FIG. 21.

Meanwhile, FIG. 22 is a diagrammatic view illustrating a form of display contents by the digital voice reproduction radio reception apparatus with a display unit of the present invention for displaying that voice reproduction is proceeding. Further, FIGS. 23 and 24 are diagrammatic views illustrating different forms of display contents for displaying missing by the digital voice reproduction radio reception apparatus with a display unit of the present invention when reception of division transmission data is missing.

When voice data for which it has been discriminated by the operation illustrated in FIG. 18, 19 or 20 whether or not the received data are divided data are to be reproduced by the digital voice reproduction radio reception apparatus with a display unit, if some division data is missing, then such an error mark as shown in FIG. 23 or 24 is displayed for a time of the division (0.5 seconds), but in a time of another division which does not include missing of reception and from which voice can be reproduced, marks representing an open mouth and a closed mouth shown in FIG. 22 are displayed alternately to notify the reception information to the receiver by means of the screen.

Next, an operation of the digital voice reproduction radio reception apparatus with a display unit of the present invention for displaying a time of missing when reception of division transmission data is missing is described.

Figure 25:
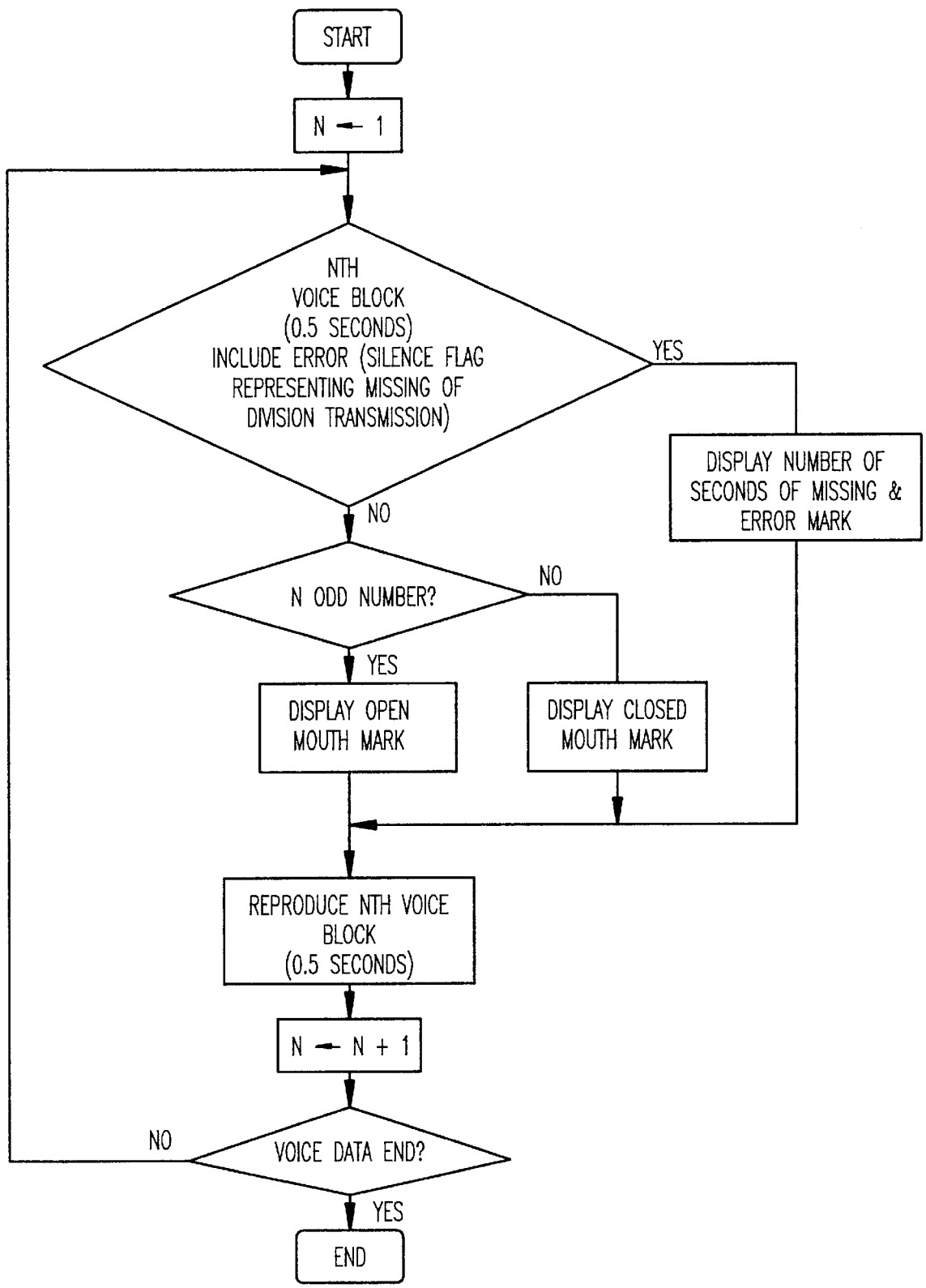
FIG. 25 is a flow chart illustrating a form of operation for displaying a time of missing when reception of divided transmission data by the digital voice reproduction radio reception apparatus with a display unit of the present invention is missing.

A form of an operation of the digital voice reproduction radio reception apparatus with a display unit of the present invention for displaying a time of missing when reception of division transmission data is missing, will be explained below with reference to FIG. 25.

Figure 26:
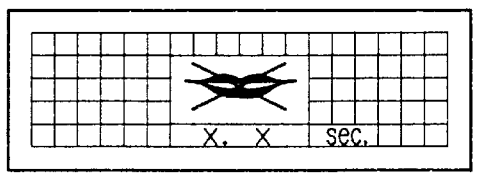
FIG. 26 is a flow chart illustrating a form of display contents for displaying a time of missing when reception of divided transmission data by the digital voice reproduction radio reception apparatus with a display unit of the present invention is missing.
Figure 27:
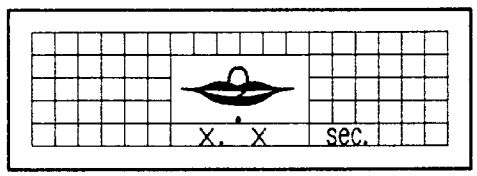
FIG. 27 is a flow chart illustrating another form of display contents for displaying a time of missing when reception of divided transmission data by the digital voice reproduction radio reception apparatus with a display unit of the present invention is missing.

Further, FIGS. 26 and 27 are diagrammatic views illustrating different forms of display contents for displaying a time of missing by the digital voice reproduction radio reception apparatus with a display unit of the present invention when reception of division transmission data is missing.

With a voice block for which it has been discriminated that it includes a miss of division transmission, a reproduction time of missing is displayed like "xx.x" together with a display of an error mark. The other operation is similar to that described with reference to FIG. 21.

Next, an operation of constructing voice compression data according to reproduction time information of the digital voice reproduction radio reception apparatus with a display unit of the present invention is described.

Figure 28:
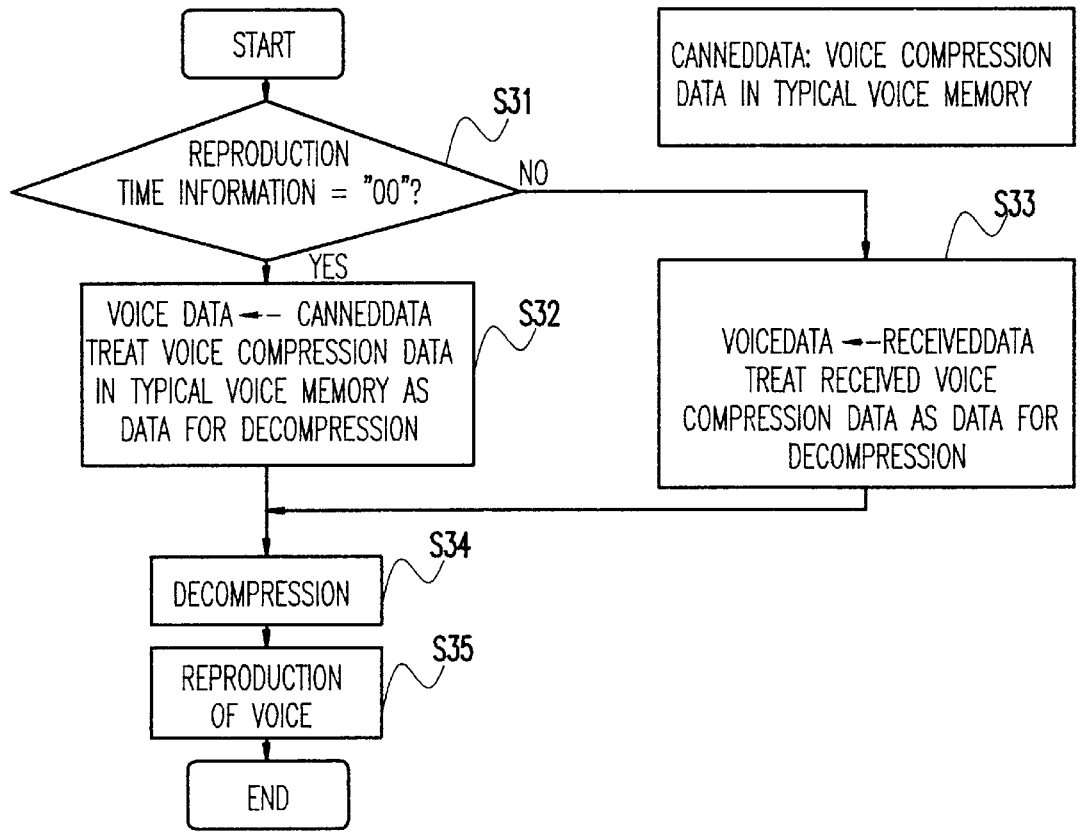
FIG. 28 is a flow chart illustrating a form of an operation for construction of voice compression data in accordance with reproduction time information of the digital voice reproduction radio reception apparatus with a display unit of the present invention.

A form of an operation of constructing voice compression data according to reproduction time information of the digital voice reproduction radio reception apparatus with a display unit of the present invention, will be explained below with reference to FIG. 28.

First, it is discriminated whether or not the reproduction time information transmitted from the digital voice radio transmission apparatus is "00" (step S31).

If it is discriminated in step S31 that the reproduction time information is "00", then since no voice compression data are transmitted, the voice compression data in the typical voice memory are treated as data for decompression (step S32).

On the other hand, if it is discriminated in step S31 that the reproduction time information is not "00", then received voice compression data are treated as data for decompression by the operation illustrated in FIG. 18, 19 or 20 (step S33).

Thereafter, voice compression data are decompressed (step S34) and reproduced (step S35).

Next, an operation of the digital voice reproduction radio reception apparatus with a display unit of the present invention for displaying a time of missing when reception of division transmission data is missing is described.

Figure 29:
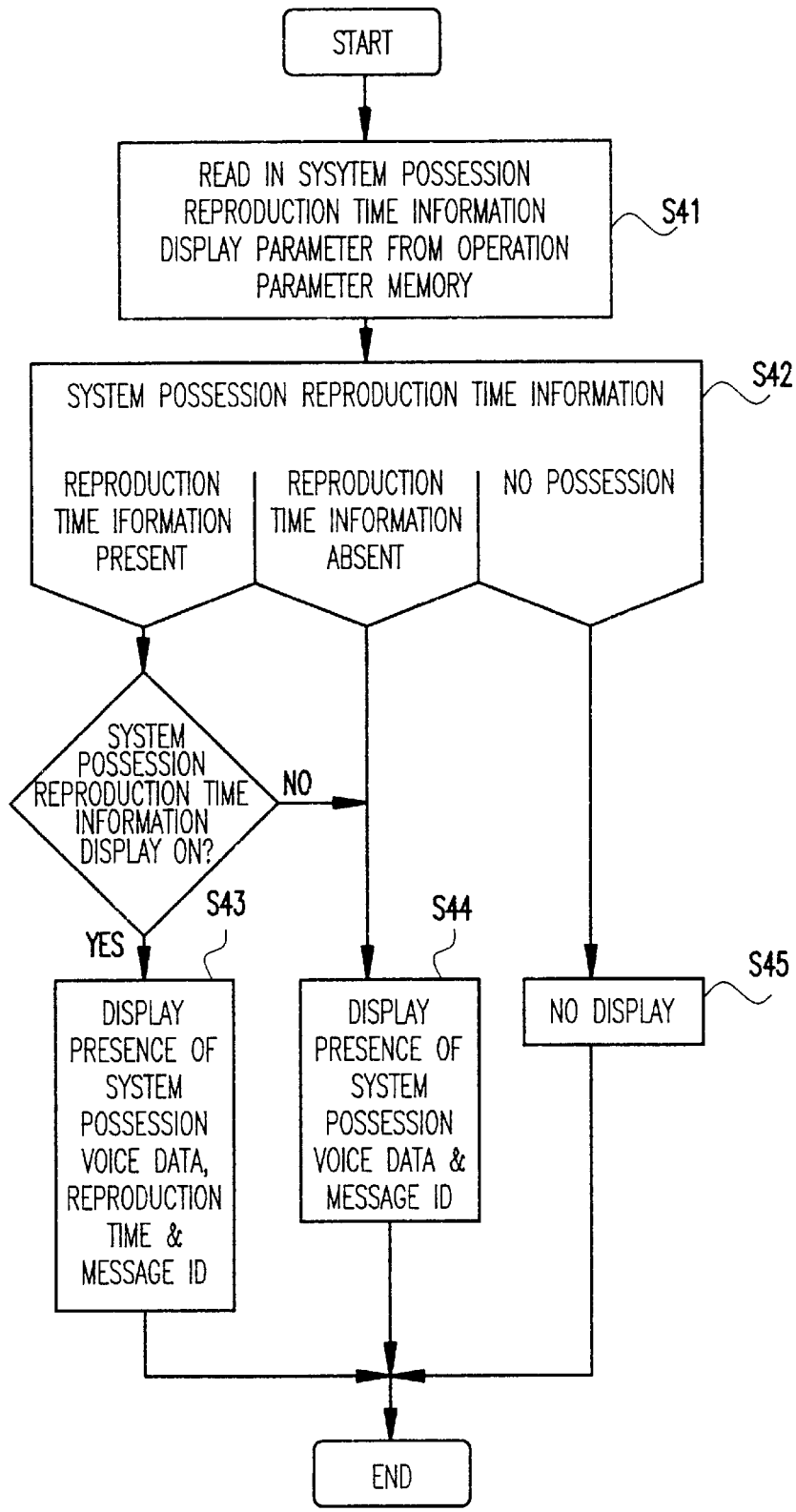
FIG. 29 is a flow chart illustrating a form of operation of the digital voice reproduction radio reception apparatus with a display unit for displaying a time of missing when reception of divisional transmission data of the digital voice reproduction radio reception apparatus with a display unit of the present invention is missing.

A form of an operation of the digital voice reproduction radio reception apparatus with a display unit of the present invention for displaying a time of missing when reception of division transmission data is missing, will be explained below with reference to FIG. 29.

First, the system possession reproduction time information display parameter is read out from the operation parameter memory in the digital voice reproduction radio reception apparatus with a display unit (step S41).

Then, presence or absence of data of the system possession reproduction time information display parameter read out in step S41 is discriminated (step S42).

If it is discriminated in step S42 that a reproduction time is provided for the system possession reproduction time information and the system possession reproduction time information display parameter is ON, then a display of "system possession voice data present", the reproduction time and a message ID are displayed on the display unit (step S43).

On the other hand, if it is discriminated in step S42 that the system possession reproduction time information display parameter is OFF or that no reproduction time information is provided for the received system possession reproduction time information, a display of "system possession voice data present" and an message ID are displayed on the display unit (step S44).

Further, if it is discriminated in step S42 that no system possession is given by the system possession reproduction time information, then no display is provided on the display unit (step S45).

Figure 30:
FIG. 30 is a diagrammatic view showing a form of display contents for displaying system possession reproduction time information of the digital voice reproduction radio reception apparatus with a display unit of the present invention.
Figure 31:
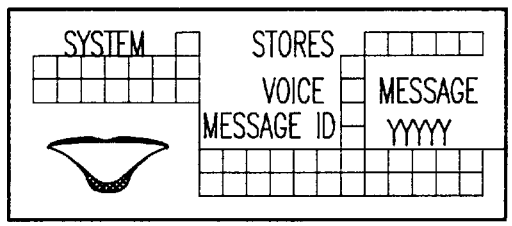
FIG. 31 is a diagrammatic view showing another form of display contents for displaying system possession reproduction time information of the digital voice reproduction radio reception apparatus with a display unit of the present invention.

When the system possession reproduction time information represents a time, such a display as shown in FIG. 30 is provided, but when the system possession reproduction time information does not represent a time but only represents possession, such a display as seen in FIG. 31 is provided.

Next, an operation of detecting a message by the digital voice reproduction radio reception apparatus with a display unit of the present invention when a data error is included in a text message length is described.

Figure 32:
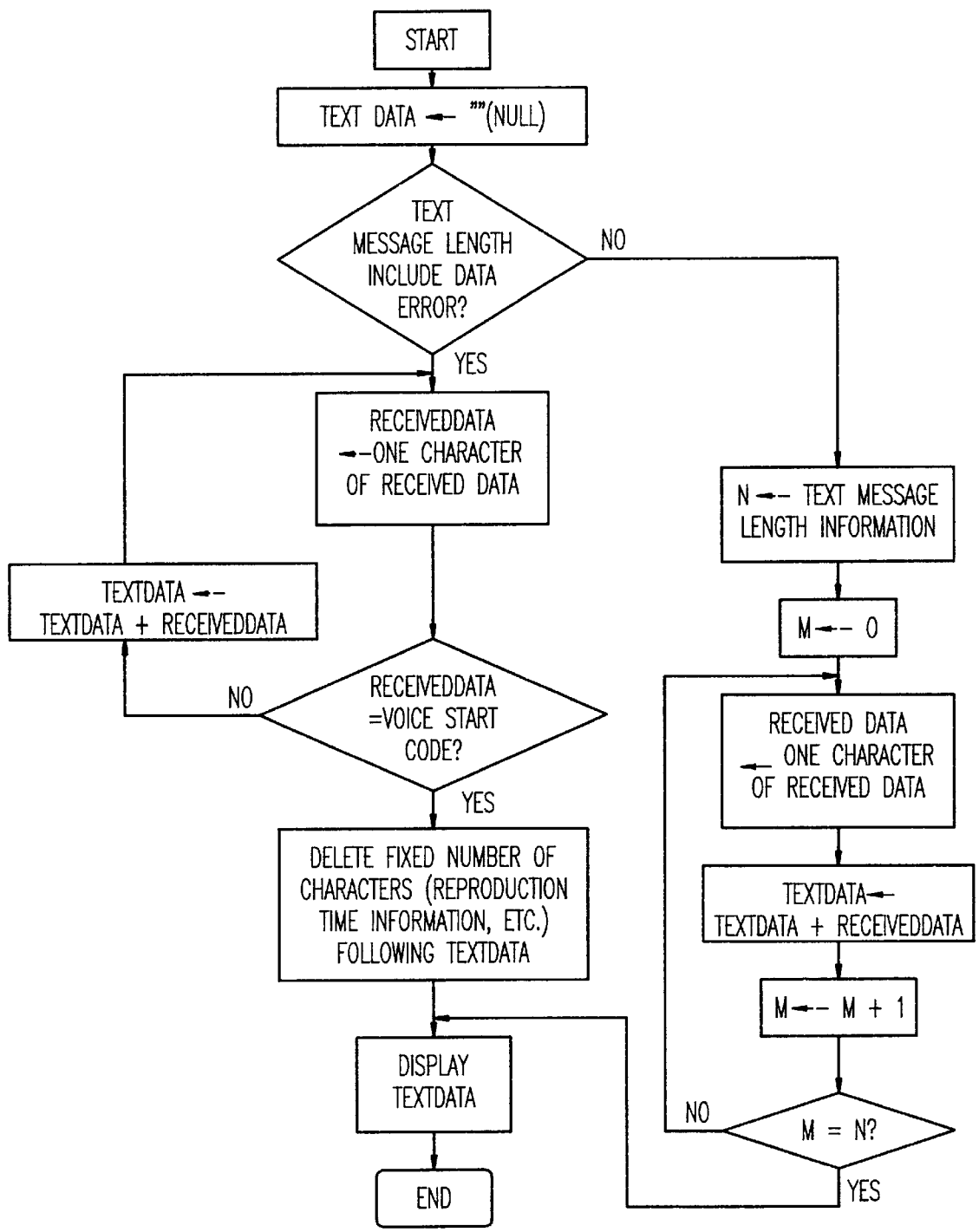
FIG. 32 is a flow chart illustrating a form of a message detection operation when there is an error in data of a text message length of the digital voice reproduction radio reception apparatus with a display unit of the present invention.

As seen from FIG. 32, when the text message length transmitted from the digital voice radio transmission apparatus does not include a data error, data received since then are fetched by a number of characters designated in the text message length as a text message. On the other hand, if the text message length includes a data error, then the actual length of the text message is unknown. In this instance, a voice start code is searched for from within the data received since then, and if this is searched out, then the data received before then from which a number of bytes of information present between the text and the voice start code are subtracted are treated as the text message.

Next, a voice compression data detection operation of the digital voice reproduction radio reception apparatus with a display unit of the present invention when a voice start code includes a data error is described.

Figure 33:
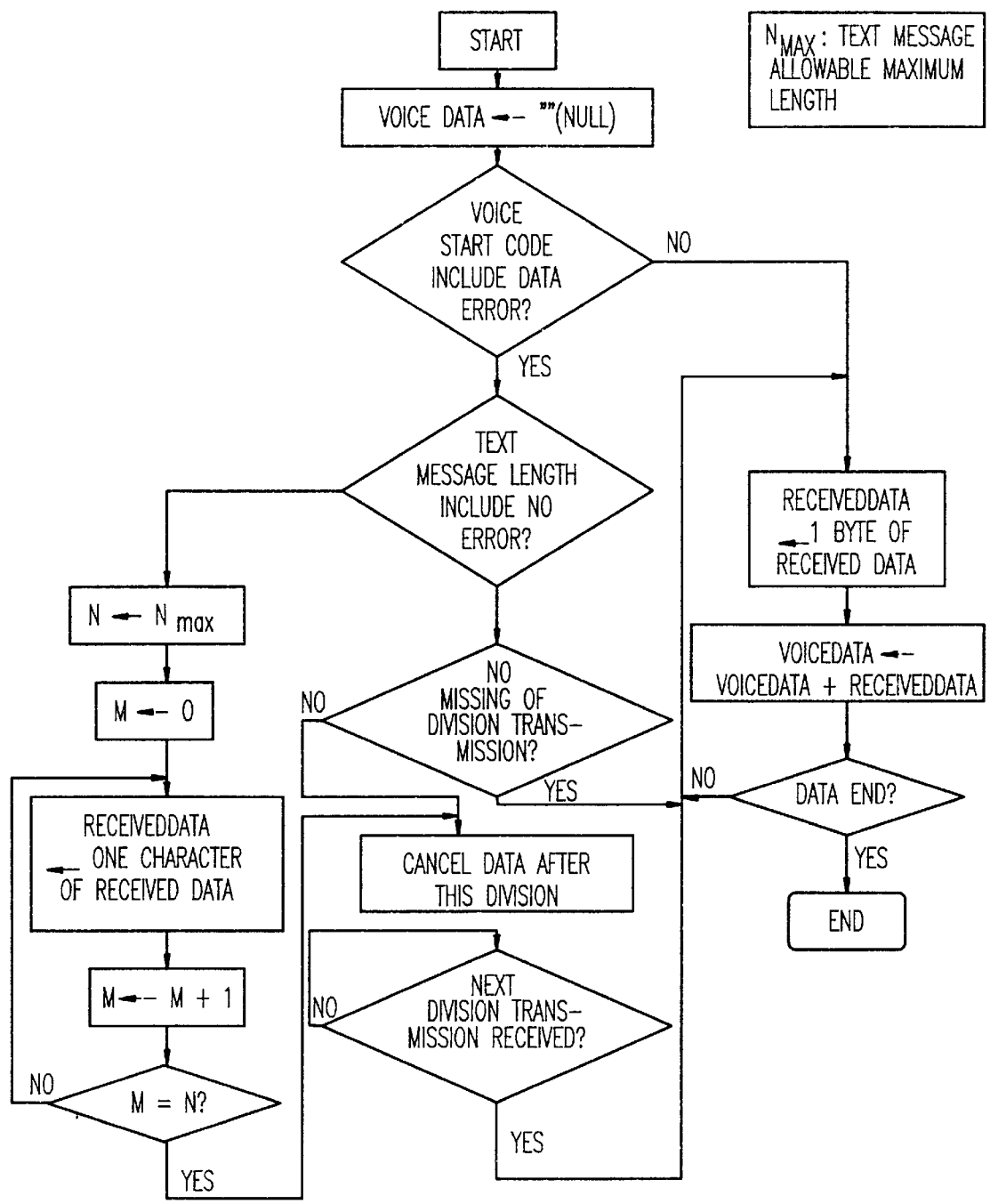
FIG. 33 is a flow chart illustrating a form of a voice compression data detection operation when there is an error in data of a text message length of the digital voice reproduction radio reception apparatus with a display unit of the present invention.

As seen in FIG. 33, when the voice start code does not include a data error, the succeeding data are fetched as voice compression data. However, when the voice start code includes a data error, the data following the reception position of the voice start code determined by the text message length are fetched as voice compression data. If the voice start code includes a data error and the text message length includes a data error, then since the place of the voice start code is unknown, it is supposed that the text message may have a maximum length, and data beginning with top data of a next division transmission following the position of the voice start code determined by the supposition are fetched as voice compression data.

It is to be understood that variations and modifications of DIGITAL VOICE TRANSMISSION SYSTEM disclosed herein will be evident to those skilled in the art. It is intended that all such modifications and variations be included within the scope of the appended claims.

What is claimed is:

1. A digital voice transmission system comprising:
    a voice storage type transmission apparatus for converting a voice message from a transmitter into digital voice data and outputting the digital voice data;
    a digital voice radio transmission apparatus for radio modulating and outputting the digital voice data outputted from said voice storage type transmission apparatus; and
    a digital voice reproduction radio reception apparatus with a display unit for receiving the digital voice data outputted from said digital voice radio transmission apparatus and reproducing voice from the digital voice data; that
    said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus; and
    said digital voice radio transmission apparatus including means for radio modulating and means for transmitting the voice data and the system possession voice data identification code outputted from said voice storage type transmission apparatus to said digital voice reproduction radio reception apparatus with a display unit.

2. A digital voice storage type transmission apparatus for use with a digital voice transmission system as set forth in claim 1, comprising:
    telephone line connection means for establishing connection to said transmitter with a telephone line;
    an analog to digital conversion circuit for converting the voice message in the form of an analog signal transmitted by said telephone line into a digital signal;
    a digital to analog conversion circuit for outputting analog voice data to said telephone line connection means;
    voice data storage means in which digital voice data and system possession voice data identification codes for identification of the digital voice data are stored;
    a digital signal processing circuit for selecting and compressing only part of the digital voice data to produce digital voice compression data as data to be transmitted and outputting data stored in said voice data storage means to said digital to analog conversion circuit in response to an access from a receiver by said telephone line;
    a CPU for controlling operation of the entire apparatus;
    a CPU program memory in which an operation program for said CPU is stored; and
    transmission means for transmitting data to said digital voice radio transmission apparatus.

3. A digital voice radio transmission apparatus for use with a digital voice transmission system as set forth in claim 1, comprising:
    inputting means for receiving data transmitted from said digital voice storage type transmission apparatus;
    an encoder for encoding the data received from said inputting means into data to be transmitted in a radio section;
    a transmission circuit for modulating the data encoded by said encoder;
    a transmission antenna for transmitting the data modulated by said transmission circuit to said digital voice reproduction radio reception apparatus with a display unit;
    a CPU for controlling operation of the entire apparatus; and
    a CPU program ROM in which an operation program for said CPU is stored.

4. A digital voice storage type transmission apparatus for use with a digital voice transmission system as set forth in claim 1, comprising:
    means for transmitting data to said digital voice radio transmission apparatus;
    said data including
        system possession voice reproduction time information representative of a reproduction time of the voice data from said transmitter;

reproduction time information representative of a reproduction time of only the selected part of the digital voice compression data;

a system possession voice data identification code for identification of the voice data; and digital voice compression data.

5. A digital voice radio transmission apparatus for use with a digital voice transmission system as set forth in claim 1, comprising;

means for receiving data from said digital voice storage type transmission apparatus;

means for transmitting data to said digital voice reproduction radio reception apparatus with display;

said data including system possession voice reproduction time information representative of a reproduction time of the voice data from said transmitter, reproduction time information representative of a reproduction time of only the selected part of the digital voice compression data, a system possession voice data identification code for identification of the voice data, and digital voice compression data, and transmits the received information to said digital voice reproduction radio reception apparatus with a display unit.

6. A digital voice reproduction radio reception apparatus with a display unit for use with a digital voice transmission system as set forth in claim 1, comprising;

means for receiving data from said digital voice radio transmission apparatus;

said data including system possession voice reproduction time information representative of a reproduction time of the voice data from said transmitter;

reproduction time information representative of a reproduction time of only the selected part of the digital voice compression data;

a system possession voice data identification code for identification of the voice data; and digital voice compression data.

7. A digital video storage type transmission apparatus for use with a digital voice transmission system as set forth in claim 1, comprising;

means for selecting, when the voice data from said transmitter are longer than a predetermined time, only the voice data in the predetermined time and means for transmitting the selected voice data to said digital voice radio transmission apparatus.

8. A digital voice reproduction radio reception apparatus with a display unit for use with a digital voice transmission system comprising:

a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data, said voice storage type transmission apparatus including means for selecting only part of the digital voice data, means for applying, to the selected digital voice data, a system possession voice data identification code for identification of the digital voice data and means for transmitting the system possession voice data identificatiotheode together with selected digital voice data to said digital voice radio transmission apparatus, and said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit;

an antenna for receiving data outputted from said digital voice radio transmission apparatus;

a reception circuit for demodulating the data received by said antenna;

a decoder for decoding the data demodulated by said reception circuit and discriminating whether or not the decoded data are destined for the apparatus itself;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; and that particular displaying including means for performing by said display unit during reproduction of voice by said loudspeaker.

9. A digital voice reproduction radio reception apparatus with a display unit as set forth in claim 8, comprising, means for inserting silence in place of a missing voice data when a divisional radio frame of the digital voice compression data divisionally transmitted by radio transmission is missing, and means for reproducing voice by said loudspeaker.

10. A digital voice reproduction radio reception apparatus with a display unit as set forth in claim 8, comprising, means for inserting silence for a fixed time irrespective of the length of the missing voice data when some divisional radio frames of the digital voice compression data divisionally transmitted by radio transmission are successively missing, and means for reproducing voice by said loudspeaker.

11. A digital voice reproduction radio reception apparatus with a display unit as set forth in claim 8, comprising, means for inserting silence for a fixed time and sound representative of missing irrespective of a length of the missing voice data when some divisional radio frames of the digital voice compression data divisionally transmitted by radio transmission are successively missing, and means for reproducing voice by said loudspeaker.

12. A digital voice reproduction radio reception apparatus with a display unit as set forth in claim 8, comprising, means for displaying a mark representative of the missing of the voice data on said display unit for a fixed time irrespective of a length of the missing voice data at a timing of the missing voice data when a divisional radio frame of the digital voice compression data divisionally transmitted by radio transmission is missing.

13. A digital voice reproduction radio reception apparatus with a display unit as set forth in claim 8, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

14. A digital voice transmission system comprising:

a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data; that said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus; and said digital voice radio transmission apparatus including means for radio modulating and means for transmitting the voice data and the system possession voice data identification code outputted from said voice storage type transmission apparatus to said digital voice reproduction radio reception apparatus with a display unit; that a data format to be transmitted includes some or all of a radio apparatus identification code for designating a destination of transmission, a message identification code representative of a message number, a division number representative of a number in order of a division when a message is divided and transmitted divisionally, a digital voice compression data identification code representative of transmission of digital voice compression data, text message length information representative of a length of a following text message, a text message, reproduction time information representative of a voice reproduction time after decompression of digital voice compression data, a system possession voice data identification code for identification of pertaining voice data possessed by the transmission side irrespective of whether or not radio transmission is employed, system possession reproduction time information representative of a reproduction time of the system possession voice data, a voice start code representative of the start of digital voice compression data, and digital voice compression data; and that the digital voice compression data are obtained by compressing digitally sampled voice data for each unit time determined in advance, and when radio digital voice transmission is performed divisionally, the voice compression data are divided with a length equal to an integral number of times that of a compressed voice data unit and allocated to radio frames.

15. A digital voice radio transmission apparatus for use with a digital voice transmission system as set forth in claim 14, comprising means for transmitting the data format.

16. A digital voice radio reproduction radio reception apparatus with a display unit for use with a digital voice transmission system as set forth in claim 14, comprising means for receiving the data format.

17. A digital voice transmission system as set forth in claim 14, comprising the text message length information representative of the length of the following text message includes a code representing that there is no following text message.

18. A digital voice transmission system as set forth in claim 14, comprising the reproduction time information representative of the voice reproduction time after decompression of the digital voice compression data includes a code representing that there is no following voice compression data.

19. A digital voice transmission system as set forth in claim 14, comprising the reproduction time information representative of the voice reproduction time after decompression of the digital voice compression data includes a code representing that following voice compression data are present but no voice reproduction time information is present.

20. A digital voice transmission system as set forth in claim 14, comprising the system possession reproduction time information representative of the reproduction time of the pertaining voice data possessed by the transmission side irrespective of whether or not radio transmission is employed includes a code representing that there is no system possession voice data.

21. A digital voice transmission system as set forth in claim 14, comprising the system possession reproduction time information representative of the reproduction time of the pertaining voice data possessed by the transmission side irrespective of whether or not radio transmission is employed includes a code representing that system possession voice data are present but there is no system possession voice reproduction time information.

22. A digital voice reproduction radio reception apparatus with a display unit for use with a digital voice transmission system as set forth in claim 14, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a typical voice memory in which typical voice data are stored;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that means for displaying particular displaying by said display unit during reproduction of voice by said loudspeaker; and that means for reproducing the typical voice data by said loudspeaker when the reproduction time information represents that there is no following voice compression data.

23. A digital voice reproduction radio reception apparatus with a display unit for use with a digital voice transmission system as set forth in claim 14, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a typical voice memory in which typical voice data are stored;

a digital signal processing circuit for processing voice compression data;

a display unit for displaying the received data;

a display unit controller for controlling operation of said display unit;

a CPU for storing data destined for the apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that means for displaying particular displaying by said display unit during reproduction of voice by said loudspeaker; and that means for reproducing the system possession reproduction time information or a display corresponding to the information on said display unit.

24. A digital voice reproduction radio reception apparatus with a display unit for use with a digital voice transmission system as set forth in claim 14, comprising:

an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice;

an operation switch for switching the operation of said CPU; and an operation parameter memory in which operation parameters for selection of operation functions of said digital voice radio transmission apparatus are stored; that the operation parameters including a parameter for setting whether or not a displaying function based on the system possession reproduction time information is to be rendered operative; and that, means for no displaying the system possession reproduction time information when it is selected that the displaying is not to be performed, means for displaying one of either time information, absence of possession or presence of possession in response to the system possession reproduction time information when it is selected that the displaying is to be performed.

25. A digital voice reproduction radio reception apparatus with a display unit for use with a digital voice transmission system as set forth in claim 14, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; and that, means for searching for a voice start code representative of a start of the digital voice compression data when it is discriminated that, from among the received data, text message length information representative of a length of the text message includes a data error by said decoder performs and means for discriminating data received prior to the voice start code as a text message.

26. A digital voice reproduction radio reception apparatus with a display unit for use with a digital voice transmission system as set forth in claim 14, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; and that, means for performing processing of received data following the stored place of the voice start code as the digital voice compression data when it is discriminated that, from among the received data, a voice start code representative of a start of the digital voice compression data includes a data error.

27. A digital voice reproduction radio reception apparatus with a display unit for use with a digital voice transmission system as set forth in claim 14, comprising:

means for receiving digital voice compression data transmitted in the digital voice transmission system, and means for decompressing the compressed voice data to reproduce voice; and an antenna for receiving data outputted from said digital voice radio transmission apparatus;

a reception circuit for demodulating the data received by said antenna;

a decoder for decoding the data demodulated by said reception circuit and discriminating whether or not the decoded data are destined for the self apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; and that, means for setting the length of the text message to an allowable maximum value of said transmission system when it is discriminated that, from among the received data, text message length information representative of a length of the text message includes a data error and besides a voice start code representative of a start of the digital voice compression data is not detected, and means for performing processing of regarding received data divisionally transmitted following the designated start place of the digital voice compression data as the digital voice compression data.

28. A digital voice reproduction radio reception apparatus with a display unit for use with a digital voice transmission system comprising;

a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data, said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus, and said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit, an antenna for receiving data outputted from said digital voice radio transmission apparatus;

a reception circuit for demodulating the data received by said antenna;

a decoder for decoding the data demodulated by said reception circuit and discriminating whether or not the decoded data are destined for that apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that particular displaying including means for performing by said display unit during reproduction of voice by said loudspeaker; and that, means for inserting silence in place of the missing voice data when a divisional radio frame of the digital voice compression data divisionally transmitted by radio transmission is missing, and means for reproducing voice by said loudspeaker, and means for displaying a mark representative of the missing of the voice data on said display unit for a fixed time irrespective of a length of the missing voice data at a timing of the missing voice data.

29. A digital voice reproduction radio reception apparatus with a display unit as set forth in claim 28, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

30. A digital voice reproduction radio reception apparatus with a display unit for use with a digital voice transmission system comprising;

a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data, said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus, and said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit;

an antenna for receiving data outputted from said digital voice radio transmission apparatus;

a reception circuit for demodulating the data received by said antenna;

a decoder for decoding the data demodulated by said reception circuit and discriminating whether or not the decoded data are destined for the apparatus itself;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that particular displaying including means for performing by said display unit during reproduction of voice by said loudspeaker; that, means for inserting silence for a fixed time irrespective of a length of the missing voice data when some divisional radio frames of the digital voice compression data divisionally transmitted by radio transmission successively miss, and means for reproducing voice by said loudspeaker; and means for displaying a mark representative of the missing of the voice data on said display unit for a fixed time irrespective of a length of the missing voice data at a timing of the missing voice data when a divisional radio frame of the digital voice compression data divisionally transmitted by radio transmission is missing.

31. A digital voice reproduction radio reception apparatus with a display unit as set forth in claim 30, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

32. A digital voice reproduction radio reception apparatus with a display unit for use with a digital voice transmission system comprising a voice storage type transmission apparatus for converting a voice message from a transmitter into digital voice data and outputting the digital voice data;

a digital voice radio transmission apparatus for radio modulating and outputting the digital voice data outputted from said voice storage type transmission apparatus; and a digital voice reproduction radio reception apparatus with a display unit for receiving the digital voice data outputted from said digital voice radio transmission apparatus and reproducing voice from the digital voice data, said voice storage type transmission apparatus including means for selecting only part of the digital voice data, means for applying, to the selected digital voice data, a system possession voice data identification code for identification of the digital voice data and means for transmitting the system possession voice data identification code together with the selected digital voice data to said digital voice radio transmission apparatus, and said digital voice radio transmission apparatus including means for radio modulating and means for transmitting the voice data and the system possession voice data identification code outputted from said voice storage type transmission apparatus to said digital voice reproduction radio reception apparatus with a display unit, said digital voice reproduction radio reception apparatus with a display unit;

an antenna for receiving data outputted from said digital voice radio transmission apparatus;

a reception circuit for demodulating the data received by said antenna;

a decoder for decoding the data demodulated by said reception circuit and discriminating whether or not the decoded data are destined for the self apparatus;

an ID memory in which an identification number of the self apparatus is stored;

a received data memory for storing the received data;

a digital signal processing circuit for processing voice compression data;

a display unit for displaying the received data;

a display unit controller for controlling operation of said display unit;

a CPU for storing data destined for the self apparatus into a reception memory and transmitting a signal to said digital signal processing circuit;

a CPU program memory in which an operation program for said CPU is stored;

digital voice reproduction means for converting digital voice data processed by said digital signal processing circuit into an analog signal;

a voice amplification circuit for amplifying the voice data after conversion into an analog signal by said digital voice reproduction means;

a voice band-pass filter for band limiting the voice data amplified by said voice amplification circuit;

a loudspeaker for producing voice; and an operation switch for switching the operation of said CPU; that particular displaying including means for performing by said display unit during reproduction of voice by said loudspeaker; that, means for inserting silence for a fixed time and sound representative of missing are inserted irrespective of a length of the missing voice data when some divisional radio frames of the digital voice compression data divisionally transmitted by radio transmission are successively missing, and means for reproducing voice by said loudspeaker; and means for displaying a mark representative of the missing of the voice data on said display unit for a fixed time irrespective of a length of the missing voice data at a timing of the missing voice data when a divisional radio frame of the digital voice compression data divisionally transmitted by radio transmission is missing.

33. A digital voice reproduction radio reception apparatus with a display unit as set forth in claim 32, comprising;

means for displaying a length of the missing voice data on said display unit for a fixed time irrespective of a length of the missing voice data at a timing of the missing voice data when a divisional radio frame of the digital voice compression data divisionally transmitted by radio transmission is missing.

* * * * *